(12) United States Patent
Ushio et al.

(10) Patent No.: US 10,469,422 B2
(45) Date of Patent: Nov. 5, 2019

(54) SYSTEM, METHOD, AND PROGRAM THAT ALLOW AUDIO CHATTING

(71) Applicant: DeNA Co., Ltd., Tokyo (JP)

(72) Inventors: Masato Ushio, Tokyo (JP); Teppei Fujisawa, Tokyo (JP); Nobuhiro Takahashi, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 245 days.

(21) Appl. No.: 15/323,192

(22) PCT Filed: May 27, 2015

(86) PCT No.: PCT/JP2015/065255
§ 371 (c)(1),
(2) Date: Dec. 30, 2016

(87) PCT Pub. No.: WO2016/002395
PCT Pub. Date: Jan. 7, 2016

(65) Prior Publication Data
US 2017/0134321 A1 May 11, 2017

(30) Foreign Application Priority Data
Jul. 1, 2014 (JP) .................................. 2014-136059

(51) Int. Cl.
*G06F 15/16* (2006.01)
*G06F 15/173* (2006.01)
(Continued)

(52) U.S. Cl.
CPC ............ *H04L 51/10* (2013.01); *G06F 3/0482* (2013.01); *G06F 3/165* (2013.01); *G06F 13/00* (2013.01);
(Continued)

(58) Field of Classification Search
CPC ................................. G06F 3/0482; G06F 3/165
(Continued)

(56) References Cited

U.S. PATENT DOCUMENTS 9,185,134 B1 * 11/2015 Story, Jr. ................. G06Q 10/10
2004/0215728 A1 10/2004 Isaacs et al.
(Continued)

FOREIGN PATENT DOCUMENTS

| CN | 103200077 A | 7/2013 |
| CN | 103546629 A | 1/2014 |

(Continued)

OTHER PUBLICATIONS

"Comparing Voice Chat and Text Chat in a Communication Tool for Interactive Television"—David Geerts, CUO/IBBT—K.U. Leuven, Jan. 2006 (Year: 2006).*
(Continued)

*Primary Examiner* — Randy A Scott
(74) *Attorney, Agent, or Firm* — Pillsbury Winthrop Shaw Pittman LLP

(57) ABSTRACT

One object is to allow communication by sound/voice other than user speeches in voice chatting. A system according to an embodiment includes a plurality of terminal devices and a server communicatively connected to the terminal devices; and the system allows voice chat between users of the terminal devices. In the system, the terminal devices of the users who are members of a chat unit and participating in the chat unit perform the voice chat communication for implementing the voice chat in the chat unit. The terminal device of one user who is a member of the chat unit makes a play request for an audio file selected by the one user to the terminal device of another user who is a member of the chat unit based on an instruction from the one user, and the terminal device of the other user plays the audio file.

10 Claims, 19 Drawing Sheets

(51) Int. Cl.

| | | |
|---|---|---|
| *H04L 29/06* | (2006.01) | |
| *H04L 29/08* | (2006.01) | |
| *H04L 12/58* | (2006.01) | |
| *G06F 13/00* | (2006.01) | |
| *H04M 11/00* | (2006.01) | |
| *G06F 3/0482* | (2013.01) | |
| *G06F 3/16* | (2006.01) | |
| *H04M 11/06* | (2006.01) | |

(52) U.S. Cl.
CPC ............ *H04L 51/04* (2013.01); *H04M 11/00* (2013.01); *H04M 11/066* (2013.01)

(58) Field of Classification Search
USPC .................. 709/204, 206, 207, 227, 228
See application file for complete search history.

(56) References Cited

U.S. PATENT DOCUMENTS

| | | | |
|---|---|---|---|
| 2006/0015560 A1 | 1/2006 | MacAuley et al. | |
| 2006/0025220 A1 | 2/2006 | MacAuley et al. | |
| 2008/0119176 A1* | 5/2008 | Chen ...................... | G01C 21/20 455/414.2 |
| 2010/0017474 A1* | 1/2010 | Kandekar .......... | H04N 7/17318 709/205 |
| 2010/0077057 A1 | 3/2010 | Godin et al. | |
| 2012/0190347 A1 | 7/2012 | Dong | |
| 2014/0018053 A1 | 1/2014 | Cho et al. | |
| 2014/0344333 A1* | 11/2014 | Pu ........................... | H04L 67/10 709/203 |

FOREIGN PATENT DOCUMENTS

| | | |
|---|---|---|
| JP | 2001-296899 A | 10/2001 |
| JP | 2002-344624 A | 11/2002 |
| JP | 2002-366179 A | 12/2002 |
| JP | 2004-267433 A | 9/2004 |
| JP | 2005-346705 A | 12/2005 |
| JP | 2006-084705 A | 3/2006 |
| JP | 2007-318706 A | 12/2007 |
| JP | 2012-215962 A | 11/2012 |
| JP | 2013-507702 A | 3/2013 |
| JP | 2013-198150 A | 9/2013 |
| JP | 2014-026351 A | 2/2014 |
| JP | 2014-050745 A | 3/2014 |
| WO | WO 2010/035222 A1 | 4/2010 |

OTHER PUBLICATIONS

International Search Report as issued in International Patent Application No. PCT/JP2015/065255, dated Aug. 18, 2015.

Final Office Action as issued in Japanese Patent Application No. 2014-136059, dated Apr. 14, 2015.

Non-Final Office Action as issued in Japanese Patent Application No. 2014-136059, dated Nov. 11, 2014.

Notice of Refusal Ground as issued in Korean Patent Application No. 10-2016-7034103, dated Nov. 22, 2017.

International Preliminary Report on Patentability and the Written Opinion of the International Searching Authority as issued in International Patent Application No. PCT/JP2015/065255, dated Jan. 3, 2017.

First Office Action as issued in Chinese Patent Application No. 201580033482.3, dated Feb. 19, 2019.

Notice of Reasons for Refusal as issued in Japanese Patent Application No. 2018-053541, dated Dec. 18, 2018.

* cited by examiner

User Information Management Table 51a

| User ID |
| --- |
| Basic Information |
| Friend Information |
| Audio Stamp Information |
| Login State |
| ... |

Fig. 3

Chat Unit Information Management Table 51b

| Chat Unit ID |
| --- |
| Member Information (User ID, Availability Flag, etc. ) |
| ... |

Fig. 4

SYSTEM, METHOD, AND PROGRAM THAT ALLOW AUDIO CHATTING

TECHNICAL FIELD

CROSS-REFERENCE TO RELATED APPLICATIONS

This application is the U.S. National Stage of PCT/JP2015/065255, filed on May 27, 2015, which is based on and claims the benefit of priority from Japanese Patent Application Serial No. 2014-136059 (filed on Jul. 1, 2014), the contents of which are hereby incorporated by reference in their entirety. The present invention relates to a system, method, and program that allow voice chat between users.

BACKGROUND

Application programs (hereunder also simply referred to as "app(s)") for performing text chats in which users exchange their text messages via terminal devices such as smartphones have been provided (for example, see Patent Literature 1). In the text chats using such an app, two or more users form a chat group and when members of the chat group input text messages for the chat group, the messages are sequentially shown in chronological order on the terminal device of each user who belongs to the chat group (each member of the chat group).

RELEVANT REFERENCES

List of Relevant Patent Literature

Patent Literature 1: Japanese Patent Application Publication No. 2014-050745

SUMMARY

In the above-described text chats, users can enjoy conversation using text messages more easily compared to conventional e-mails. However, there may be some disadvantages caused by using text messages. For example, text massages remain as history so that users may have to be very careful in making remarks (sending text messages) and may feel a sense of obligation to replay each time he/she sees others' messages. Moreover, there is a limit for real-time communication for the text messages since users have to take a long time to input, send and see (view) text messages.

A voice chatting using a mechanism such as an Internet telephony allows a real-time communication without the text messages. However, the voice chatting does not provide communication that exceeds a conventional telephone communication. For example, in the conventional voice chatting, voice communication is limited to interaction through user speeches inputted by voice using microphones or the like. Accordingly, there is a demand for a setup that allows communication by sound/voice other than user speeches in voice chatting.

One object of the embodiments of the present invention is to allow communication by sound/voice other than user speeches in voice chatting. Other objects of the embodiments of the present disclosure will be apparent with reference to the entire description in this specification.

A system according to an embodiment of the present invention includes a plurality of terminal devices and configured to allow a voice chat between users of the plurality of terminal devices, wherein the terminal devices of at least part of a plurality of users who are members of a chat unit perform voice chat communication for implementing the voice chat in the chat unit, the voice chat being performed in a unit of the chat unit, the terminal device of a first user who is a member of the chat unit requests, based on an instruction from the first user, the terminal device of a second user who is a member of the chat unit to play an audio file selected by the first user, and the terminal device of the second user plays the audio file in response to the request for playing the audio file.

A method according to an embodiment of the present invention is a method of allowing a voice chat between users of a plurality of terminal devices, the method comprising the steps of: performing, by the terminal devices of at least part of a plurality of users who are members of a chat unit, voice chat communication for implementing the voice chat in the chat unit, the voice chat being performed in a unit of the chat unit; requesting, by the terminal device of a first user who is a member of the chat unit, based on an instruction from the first user, the terminal device of a second user who is a member of the chat unit to play an audio file selected by the first user; and playing, by the terminal device of the second user, the audio file in response to the request for playing the audio file.

A program according to an embodiment of the present invention allows a voice chat between users of a plurality of terminal devices, the program causing, upon execution on the plurality of terminal devices, the steps of: performing, by the terminal devices of at least part of a plurality of users who are members of a chat unit, voice chat communication for implementing the voice chat in the chat unit, the voice chat being performed in a unit of the chat unit; requesting, by the terminal device of a first user who is a member of the chat unit, based on an instruction from the first user, the terminal device of a second user who is a member of the chat unit to play an audio file selected by the first user; and playing, by the terminal device of the second user, the audio file in response to the request for playing the audio file.

Herein, "a chat unit" includes, for example, a chat room, a chat group, a chat session, and the like. Also, "performing voice chat communication" includes, for example, transmitting audio data of sound/voice that is input via an audio input unit of one terminal device to another terminal device, and receiving audio data of sound/voice that is input via an audio input unit of the other terminal device.

Various embodiments of the present invention allow communication by voice other than user speeches in voice chatting.

BRIEF DESCRIPTION OF THE DRAWINGS

FIG. 3 is a diagram showing an example of information managed by a user information management table 51*a* according to an embodiment.

FIG. 4 is a diagram showing an example of information managed by a chat unit information management table 51*b* according to an embodiment.

DESCRIPTION OF EXAMPLE EMBODIMENTS

Figure 1:
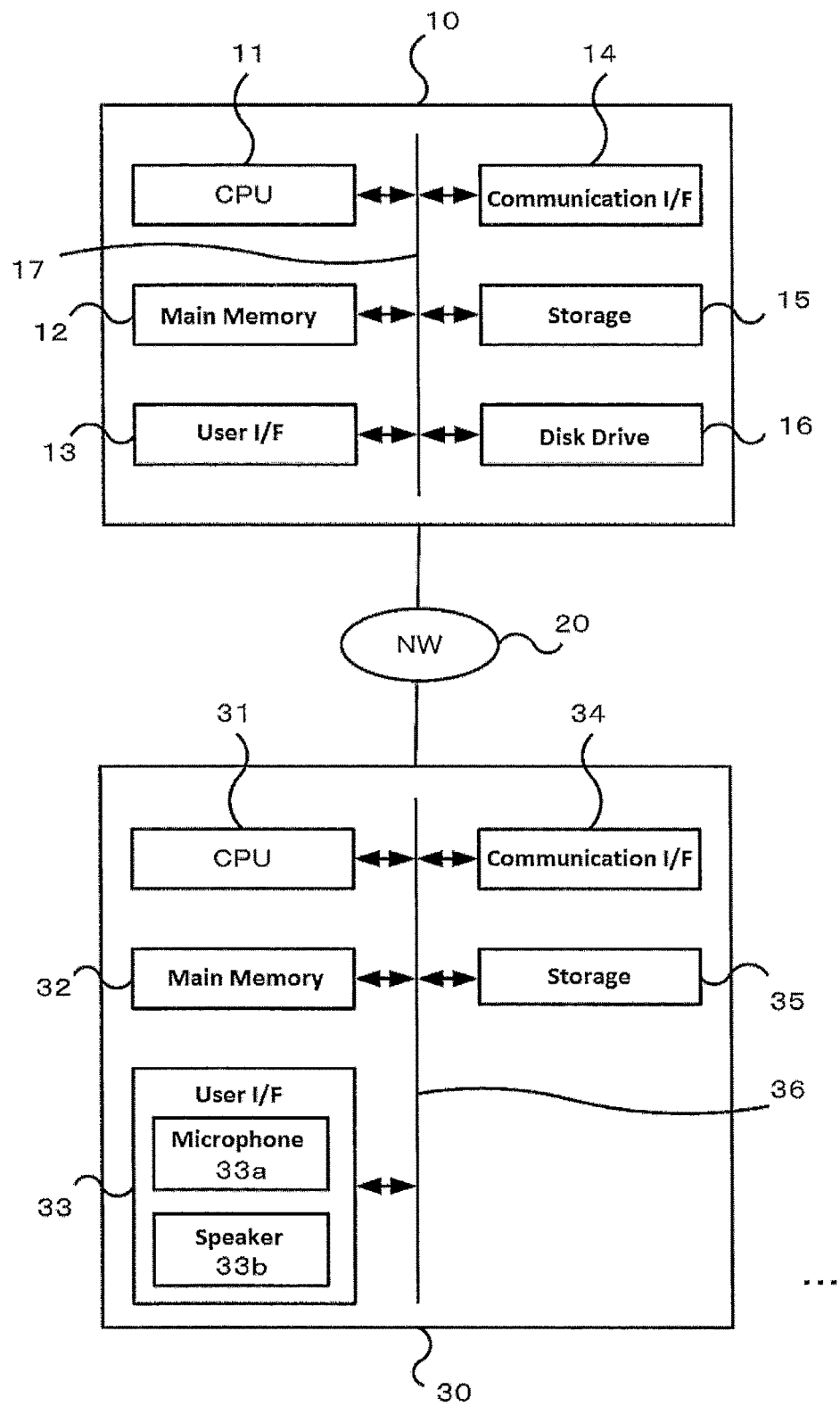
FIG. 1 is a block diagram schematically illustrating the system 1 according to an embodiment of the disclosure.

FIG. 1 is a block diagram schematically illustrating the system 1 according to an embodiment of the disclosure. As shown, the system 1 according to an embodiment may include a plurality of terminal devices 30 and a server 10 communicatively connected to the terminal devices 30 via a communication network 20 such as the Internet; and the system 1 may allow voice chat between users of the terminal devices 30.

The server 10 according to an embodiment may provide, to users who operate the terminal devices 30, in addition to the voice chat service, various digital contents service including online games, electronic books, video contents, and music contents; a communication platform service (SNS platform) for implementing various user-to-user communication features such as text chat (mini mail), circle, avatar, diary, message board, and greeting, etc.; and various Internet services including electronic commerce services, etc.

As illustrated, the server 10 according to the embodiment is configured as a common computer device and may include a central processing unit (CPU) (computer processor) 11, a main memory 12, a user interface (I/F) 13, a communication I/F 14, a storage 15, and a disk drive 16, and these components may be electrically connected to one another via a bus 17. The CPU 11 may load an operating system and various other programs into the main memory 12 from the storage 15, and may execute commands included in the loaded programs. The main memory 12 may be used to store a program to be executed by the CPU 11, and may be formed of, for example, a dynamic random access memory (DRAM) or the like. The server 10 according to an embodiment may be constituted by computer devices that have the above-described hardware configurations.

The user I/F 13 may include, for example, an information input device such as a keyboard and a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminal devices 30 via the communication network 20.

The storage 15 may be constituted by, for example, a magnetic disk drive and store various programs such as a control program for controlling the provision of various services. The storage 15 may also store various data used in the provision of various services. The various data that may be stored in the storage 15 may also be stored on a database server communicatively connected to the server 10 and physically separate from the server 10. The disk drive 16 may read data stored in storage medium such as a compact disc read only memory (CD-ROM), digital versatile disc read only memory (DVD-ROM), or DVD Recordable (DVD-R) disc, or write data to such a storage medium.

In an embodiment, the server 10 may function as a web server for managing a web site including a plurality of hierarchical web pages and may provide the terminal devices 30 with various above-mentioned Internet services through the web site. The storage 15 may also store the HTML data corresponding to the web page. Additionally, the HTML data may include programs written in script languages such as JavaScript™.

In an embodiment, the server 10 may provide various Internet services to the terminal devices 30 through applications executed on execution environments other than a web browser on the terminal devices 30. The storage 15 may also store such applications. The application programs may be created in, for example, programing languages such as Objective-C™ and Java™ and contain various image data. The application stored on the storage 15 may be delivered to the terminal devices 30 in response to a delivery request. The terminal devices 30 may download such applications from a server (a server providing application markets) other than the server 10.

Thus, the server 10 may manage the web site for providing various services and deliver web pages (HTML data) constituting the web site in response to a request from the terminal devices 30, thereby providing various services to users of the terminal devices 30. Also, the server 10 can provide various services based on communication with an application performed on the terminal devices 30 in place of, or in addition to, such web-page (web browser)-based services. The server 10 can transmit and receive various data (including data necessary to display a screen) to/from the terminal devices 30 in order to provide services in any manner. The server 10 can store various types of data that are required to provide services. The server 10 may store such data for each piece of identification information (for example, user ID) that identifies each user and thereby can manage the status of the provided services (e.g., progress of the game) for each user. Briefly, the server 10 may also include a function to authenticate a user at start of the service and perform charging process in accordance with provision of the service.

The terminal device 30 according to an embodiment may be any information processing device that may display on a web browser a web page of a web site provided by the server 10 and include an executing environment for executing applications. Example of such information processing device may include personal computers, smartphones, tablet terminals, wearable devices, and game-dedicated terminals.

As illustrated in FIG. 1, the terminal device 30 may be configured as a typical computer device that includes a central processing unit (CPU) (computer processor) 31, a main memory 32, a user interface (I/F) 33, a communication I/F 34, and a storage 35, and these components may be electrically interconnected via a bus 36.

The CPU 31 may load an operating system and various other programs into the main memory 32 from the storage 35, and may execute commands included in the loaded programs. The main memory 32 may be used to store a program to be executed by the CPU 31, and may be constituted by, for example, a dynamic random access memory (DRAM) or the like.

The user I/F 33 may include, for example, an information input device such as a touch panel, a keyboard, a button, and a mouse for accepting an input from a user, and an information output device such as a liquid crystal display for outputting calculation results of the CPU 31. The user I/F 33 may include a conventional microphone 33a (an audio input unit) configured to accept input of voice/sound and convert the input voice/sound into an electric signal, and a conventional speaker (an audio output unit) 33b configured to convert the electric signal into voice/sound and output it. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server 10 via the communication network 20.

The storage 35 may include, for example, a magnetic disk drive or a flash memory and store various programs such as an operating system. The storage 35 may also store various applications received from the server 10 and the like.

The terminal device 30 may include, for example, a web browser for interpreting an HTML file (HTML data) and rendering a screen; this web browser may enable the terminal device 30 to interpret the HTML data fetched from the server 10 and render web pages corresponding to the received HTML data. A plug-in software that can execute files of various formats associated with the HTML data may be embedded in the web browser of the terminal device 30.

When a user of the terminal device 30 receives various services provided by the server 10, for example, animation or an operation icon designated by HTML data or applications may be displayed on a screen of the terminal device 30. A user can input various instructions via a touch panel or the like of the terminal device 30. The instruction entered by the user may be transmitted to the server 10 through the web browser or a function of an execution environment such as NgCore™ on the terminal device 30.

Figure 2:
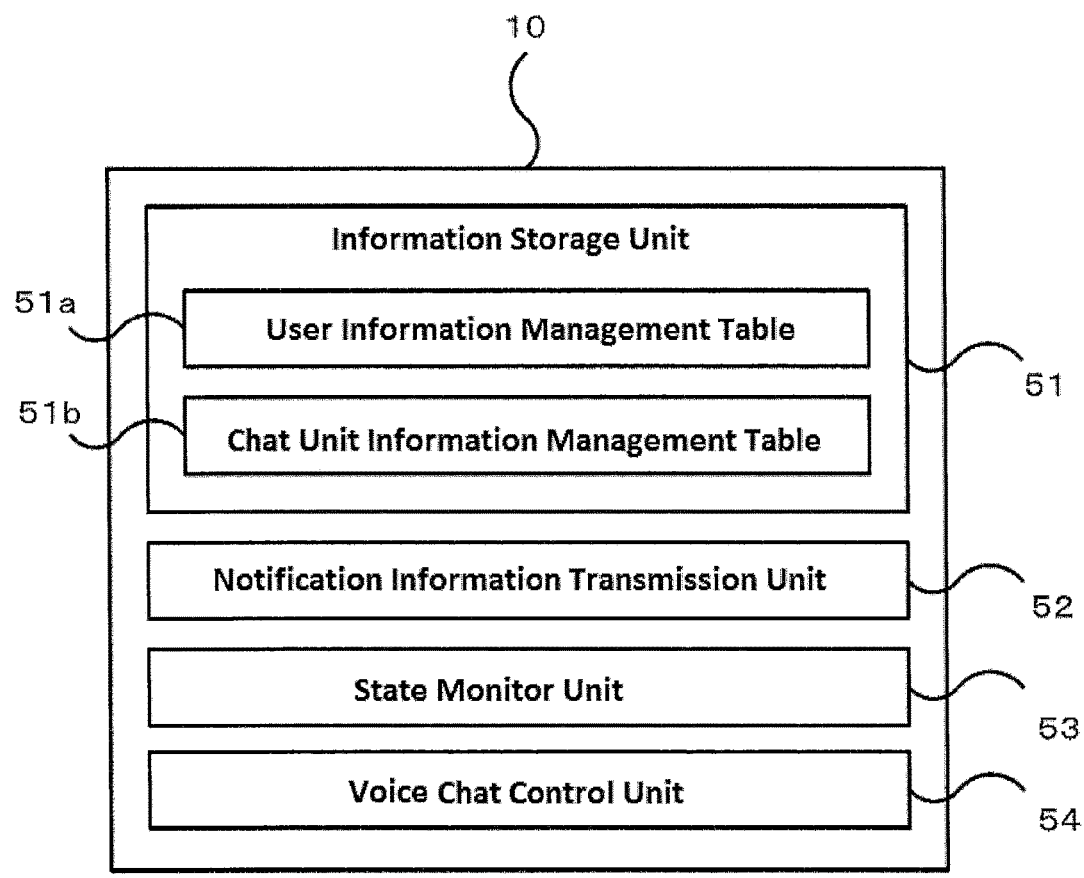
FIG. 2 is a block diagram illustrating the functionalities of the server 10 according to an embodiment.

Next, operations of the above-described server 10 according to an embodiment will be now described. The server 10 according to the embodiment may include various features to provide the above-described various Internet services, but hereunder a feature to manage voice chat will be mainly described. FIG. 2 is a block diagram schematically illustrating the functionality of the server 10 according to an embodiment. As shown, the server 10 may include an information storage unit 51 that store various types of information, and a notification information transmission unit 52 that transmits predetermined notification information to a terminal device 30 of an invited user who is invited to a voice chat in response to receiving a voice chat initiation request to voice-chat with the invited user from a terminal device 30 of a requesting user. The server 10 may further include a state monitor unit 53 that monitors whether the requesting user and the invited user are in an available state in which they are able to perform a voice chat, and a voice chat control unit 54 that allows a voice chat communication between the terminal device 30 of the requesting user and the terminal device 30 of the invited user when the requesting user and the invited user are in the available state. These functionalities can be implemented by cooperation between hardware such as the CPU 11 and the main memory 12 of the server 10 and software such as various programs stored in the storage 15 and the like. For example, instructions included in one or more computer programs corresponding to the above-described functionalities may be executed by the CPU 11 of the server 10 to implement the above-described functionalities.

The information storage unit 51 may be implemented by means of storage 15 and the like of the server 10. The information storage unit 51 may include a user information management table 51a that manages user information concerning users, and a chat unit information management table 51b that manages chat-unit information concerning a chat unit which is a unit of voice chat performed between users. FIG. 3 is a diagram showing an example of information managed by the user information management table 51a according to an embodiment. As shown, the user information management table 51a manages, in association with a "user ID" that identifies an individual user, "basic information" of the user (that may include, for instance, a nickname, gender, age, an image of the user, and the like), "friend information" concerning friends of the user (for instance, a friend can be made when one user accepts a friend request from other user), "audio stamp information" concerning audio stamps owned by the user, and "login state" that indicates a login state (online state) of the user in the voice chat service, and the like.

The "audio stamp" mentioned above will be now described. The audio stamp is an audio file that can be used in the voice chat service according to one embodiment and can be played (audio-output) on the terminal devices 30 of individual users. The audio stamp may be configured as, for example, an audio file that has a file format of WAV, AIFF, or the like. In one embodiment, the audio stamps owned by the user may be stored in the terminal device 30 of the user and redundantly in the server 10 (for instance, the storage 15). The audio stamps stored in the terminal device 30 and the audio stamps stored in the server 10 may be synchronized automatically or in response to a user's operation. Users may obtain an audio stamp by purchasing it, or receiving it from other users as gifts. Moreover, in one embodiment, users themselves may create (record) audio stamps that can be used in the voice chat service. The "audio stamp information" in the above-mentioned user information management table 51b may include, for example, identification information (including file names) that identify individual audio stamps (audio files), and information such as icons, names, and descriptions of the audio stamps.

FIG. 4 illustrates an example of information managed in the chat unit information management table 51b according to one embodiment. As shown, the chat unit information management table 51b may manage, in association with a "chat unit ID" that identifies an individual chat unit, "member information" that indicates member users of the chat unit, and the like. The "chat unit" in one embodiment is a unit of voice chats performed among users as described above, and may also be referred to as a chat room, a chat group or the like. The "member information" may include a "user ID" of each member user who belongs to the chat unit, an "availability flag" that indicates whether each user is in the available state to perform voice chat in the chat unit. In one embodiment, members in the chat unit may include a user who created the chat unit (who newly started the voice chat), a user(s) who have been invited to the chat unit by the user who created the chat unit, and a user(s) who have been invited from the invited user(s).

The state monitor unit 53 in one embodiment may monitor whether the requesting user and invited user(s) (members of a chat unit) are in the available state in which they can perform a voice chat, as described above. More specifically, monitoring of a user may be performed by updating the "availability flag" in the "member information" managed in the above-mentioned chat unit information management table 51b based on various types of data transmitted from the terminal device 30 when the user operates the terminal device. This will be further descried later.

As described above, the voice chat control unit 54 in one embodiment may allow a voice chat communication between the terminal device 30 of the requesting user and the terminal device 30 of the invited user when the requesting user and the invited user are in the available state. In the case where the number of users which are members of a chat unit is three or more, a voice chat communication is allowed among the terminal devices 30 of the users when two or more users are in the available state. More specifically, the voice chat communication may be implemented by transmitting, to other terminal device(s) 30, audio data of voice/sound that is input through the microphone 33a of each terminal device 30. In this case, the server 10 may receive audio data from each terminal device 30 and transfer the audio data to other terminal devices 30, or audio data from each terminal device 30 may be directly transmitted to other terminal devices 30. Alternatively, audio data from each terminal device 30 may be transmitted to other terminal devices 30 via any computer other than the server 10. In other words, one or more terminal devices 30 (which may include a terminal device 30 that performs a voice chat communication and a terminal device 30 that does not perform a voice chat communication) or other device(s) may have a part or all of the functions of the voice chat control unit 54 of the server 10. Transmission of audio data to a terminal device 30 may be performed by streaming, for example.

Figure 5:
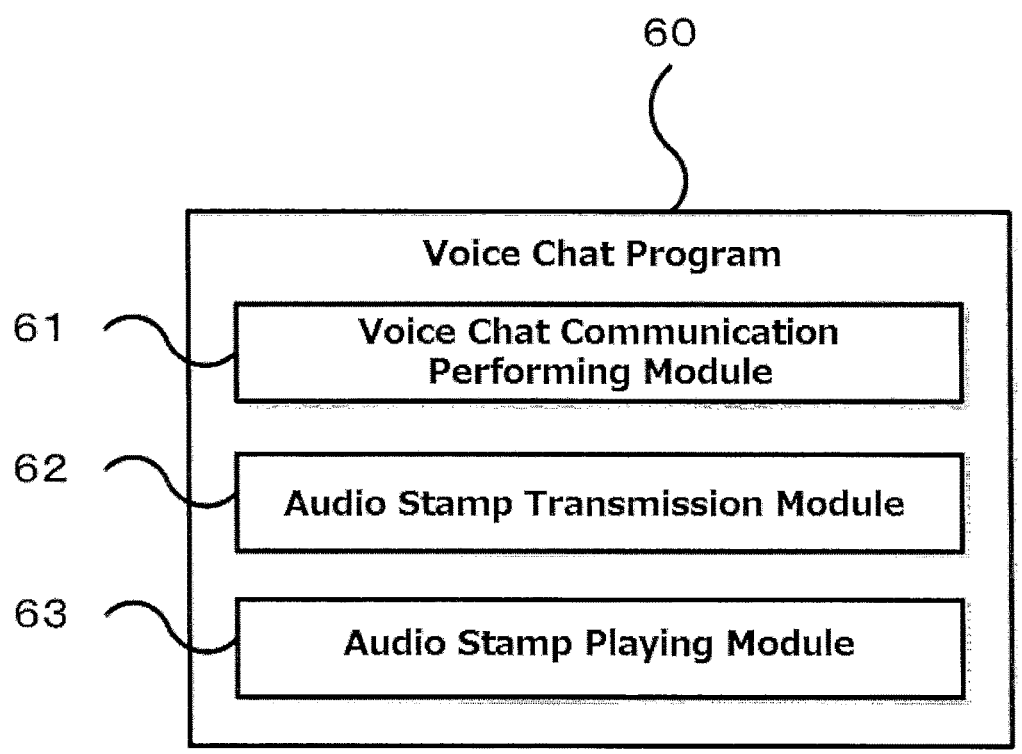
FIG. 5 is a block diagram illustrating functions of a voice chat program 60 according to an embodiment.

Next, a voice chat program 60 according to an embodiment of the present invention performed (by the CPU 31) on the terminal device 30 will now be described. The voice chat program 60 may allow the user of the terminal device 30 to use the voice chat service provided by the server 10 and may be configured as HTML data or an application. FIG. 5 is a block diagram illustrating the functions (module configuration) of the voice chat program 60 according to an embodiment. As shown, the voice chat program 60 according to an embodiment may include a voice chat communication performing module 61 configured to perform voice chat communication with other terminal devices 30, an audio stamp play requesting module 62 configured to request, in response to an instruction from the user, an audio stamp (an audio file) selected by the user to be played by terminal devices 30 of other users who are members of the chat unit to which the user belongs, and an audio stamp playing module 63 configured to play the audio file in response to the request for playing the audio stamp. More specifically, the voice chat communication performing module 61 may transmit audio data of voice/sound input via the microphone 33a of the terminal device 30, and receive audio data of voice/sound input via the microphone 33a of other terminal device 30 to output the audio data as voice/sound via the speaker 33b. The voice chat communication performing module 61 may cooperate with the voice chat control unit 54 of the server 10 described above.

Figure 6:
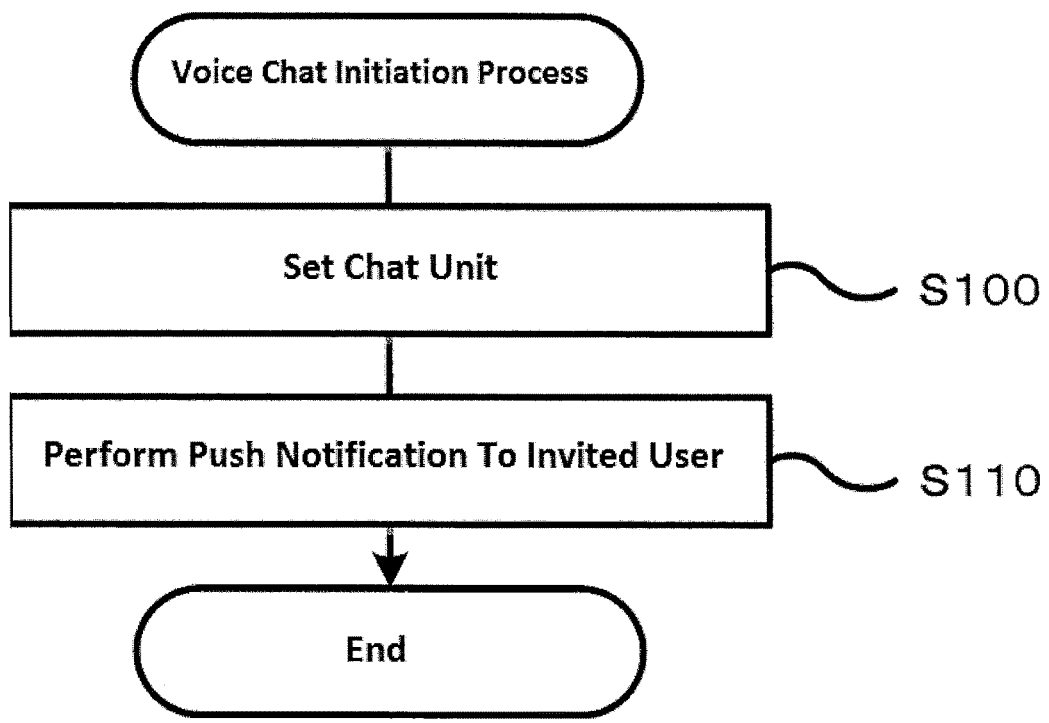
FIG. 6 is a flow diagram showing an example of a voice chat initiation process according to an embodiment.

Next, operation of the system 1 according to an embodiment will be described. FIG. 6 is a flow diagram showing an example of a voice chat initiation process performed by the server 10 when a user of a terminal device 30 newly starts a voice chat. The voice chat initiation process may be performed when a voice chat initiation request is received from the user of the terminal device 30. In one embodiment, the voice chat initiation request by a user may be performed via a voice chat service screen 70 displayed on the terminal device 30. The voice chat service screen 70 according to one embodiment will be now described.

Figure 7:
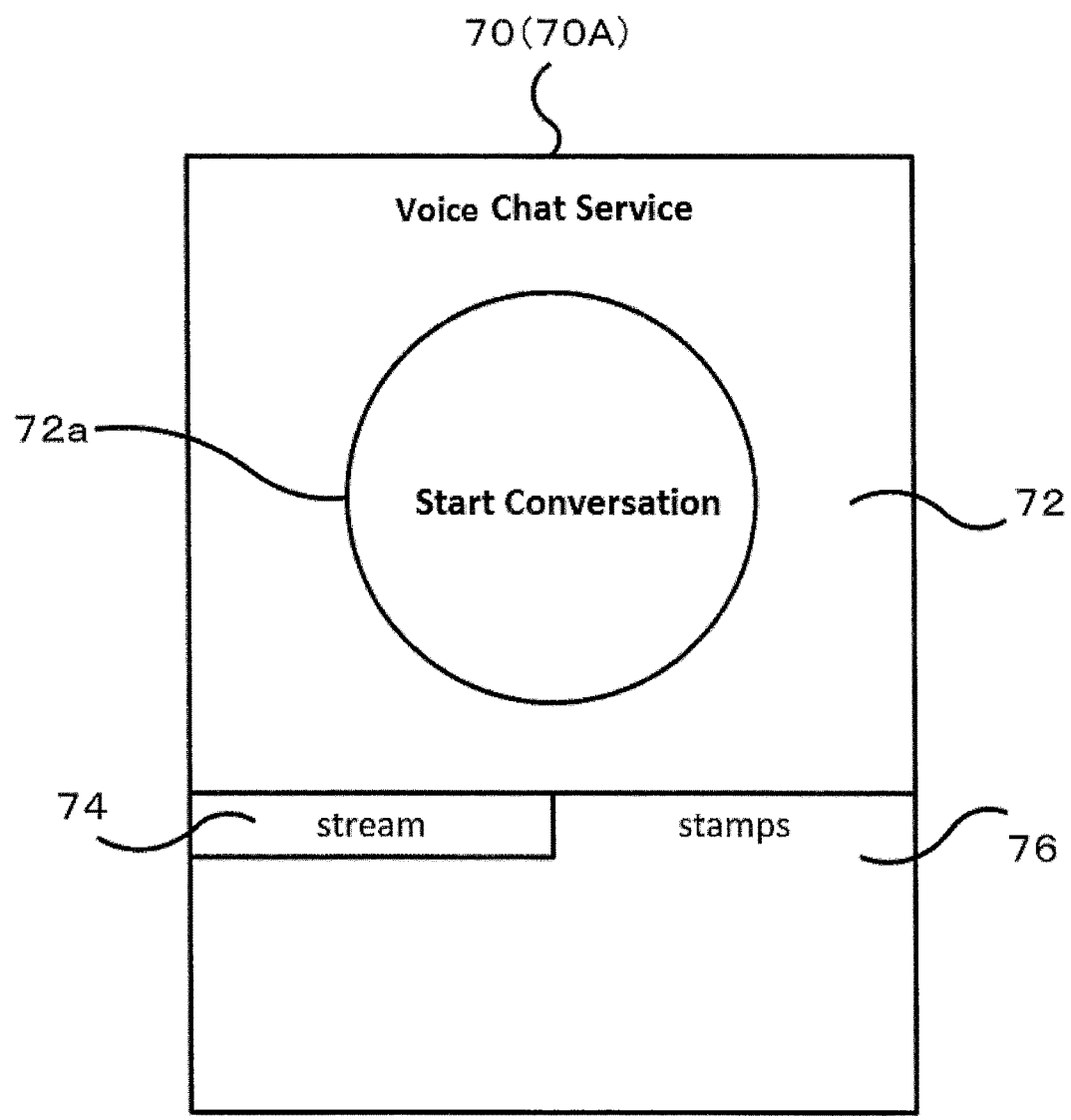
FIG. 7 illustrates an example of an initial screen 70A of a voice chat service screen 70 according to an embodiment.

The voice chat service screen 70 may be shown when the voice chat program 60 is executed on the terminal device 30, and may allow use of the voice chat service provided by the server 10. FIG. 7 illustrates an example of an initial screen 70A of the voice chat service screen 70. As shown, the voice chat service screen 70 may include a main area 72 situated in an upper area of the screen, and a stream area 74 that is situated in a lower left area of the screen and informs a user of various information concerning the voice chat service, and a stamp area 76 that is situated in a lower right area of the screen and shows information concerning audio stamp(s). In the main area 72, various information according to different situations of use of the voice chat service may be displayed. As shown, the stream area 74 and the stamp area 76 are tabbed areas where an area to be shown can be switched by selecting the tab. On the initial screen 70A illustrated in FIG. 6, a start button 72a captioned with "Start Conversation" may be provided in the main area 72. The start button 72a is a button for a user to instruct to start a new voice chat (create a chat unit). The main area 72 of the initial screen 70A may be configured to show a history of voice chats (chat units) which have been performed.

Figure 8:
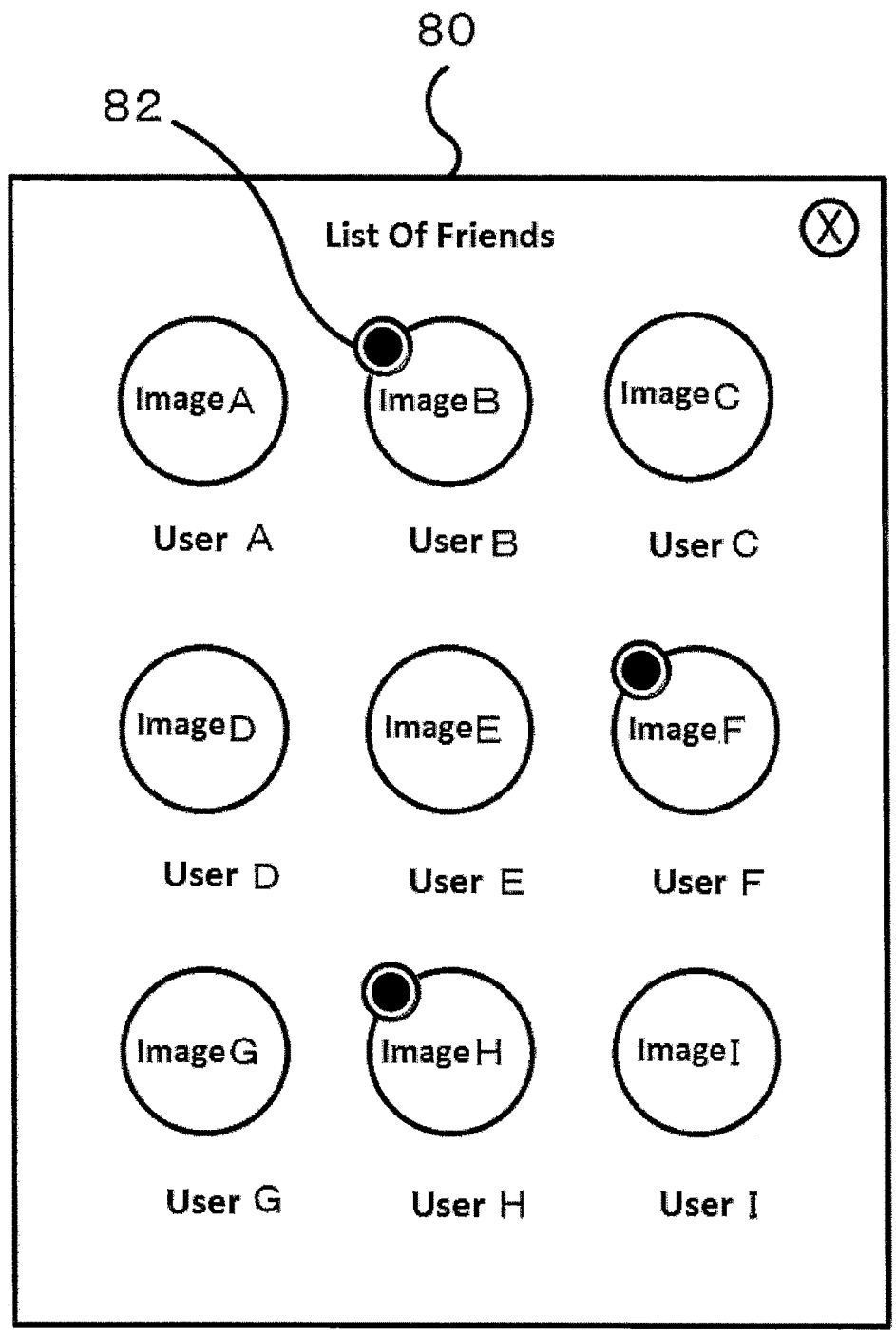
FIG. 8 illustrates an example of a friend list screen 80 according to an embodiment.

When a user selects the start button 72a, a friend list screen 80 illustrated in FIG. 8 may be overlaid on the voice chat service screen 70 (the initial screen 70A). As shown, the friend list screen 80 may show a list of information concerning friends of the user of the terminal device 30 (for example, images of users, nicknames and the like). Friends of the user may be managed in the "friend information" in the user information management table 51a and the information displayed on the friend list screen 80 may be transmitted from the server 10 to the terminal device 30 in response to a request from the terminal device 30. In one embodiment, the user is able to check a login state of the friends on the list by a login indicator 82 that is shown on the upper left corner of the image of a user who is logged in the voice chat service (such information may be managed in the "login state" of the user information management table 51a).

Figure 9:
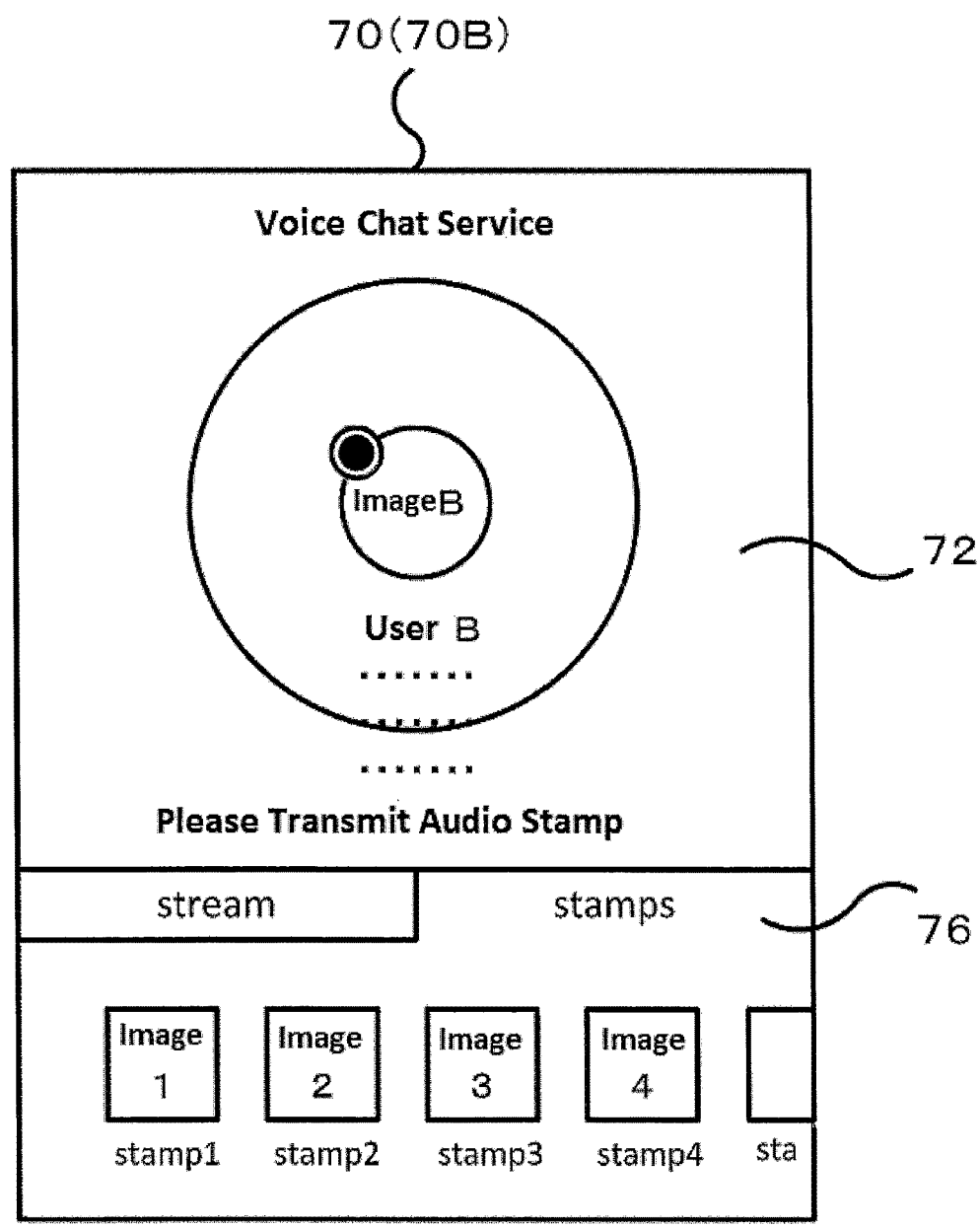
FIG. 9 illustrates an example of a friend details screen 70B of the voice chat service screen 70 according to an embodiment.

When the user selects a desired user(s) (friend(s)) to invite to the voice chat from among the friends listed on the friend list screen 80, the voice chat service screen 70 may transition to a friend details screen 70B illustrated in FIG. 9. As shown, on the friend details screen 70B, the main area 72 may show basic information about the selected user(s) (a user B in this example), and the stamp region 76 may show a list of information about audio stamps (for example, an icon image, name, description and the like) owned by the selected user. The information about the audio stamps owned by the selected user may be managed in the "audio stamp information" of the user information management table 51a.

In one embodiment, by selecting any one of the audio stamps in the list shown in stamp area 76 of the friend details screen 70B illustrated in FIG. 9, the user can make a request to start a voice chat with the selected user. More specifically, when the user selects any one of the audio stamps, a voice chat initiation request together with invited user information that identifies the selected user (an user to be invited to the voice chat) and audio stamp identification information that identifies the selected audio stamp may be transmitted from the terminal device 30 to the server 10.

When the voice chat initiation request is performed by selecting any of the audio stamps shown in the list in the stamp area 76, the user may be allowed to check the sound/voice corresponding to the audio stamp (the contents of the audio file) before the user transmits the request. For example, when a user selects any of the audio stamps in the stamp area 76, an audio file corresponding to the selected audio stamp may be transmitted from the server 10 to the terminal device 30 and the terminal device 30 may play the received audio file. Subsequently the user may confirm the stamp (for example, by selecting a confirm button or the like) to perform the voice chat initiation request. Furthermore, the user of the terminal device 30 may be allowed to obtain a part or all of the audio stamps (audio files) owned by the selected user(s) when the user performs a corresponding operation on the terminal device 30. In this case, the obtained audio stamp(s) may be downloaded in the terminal device 30 and stored in the storage 35 or the like.

Figure 10:
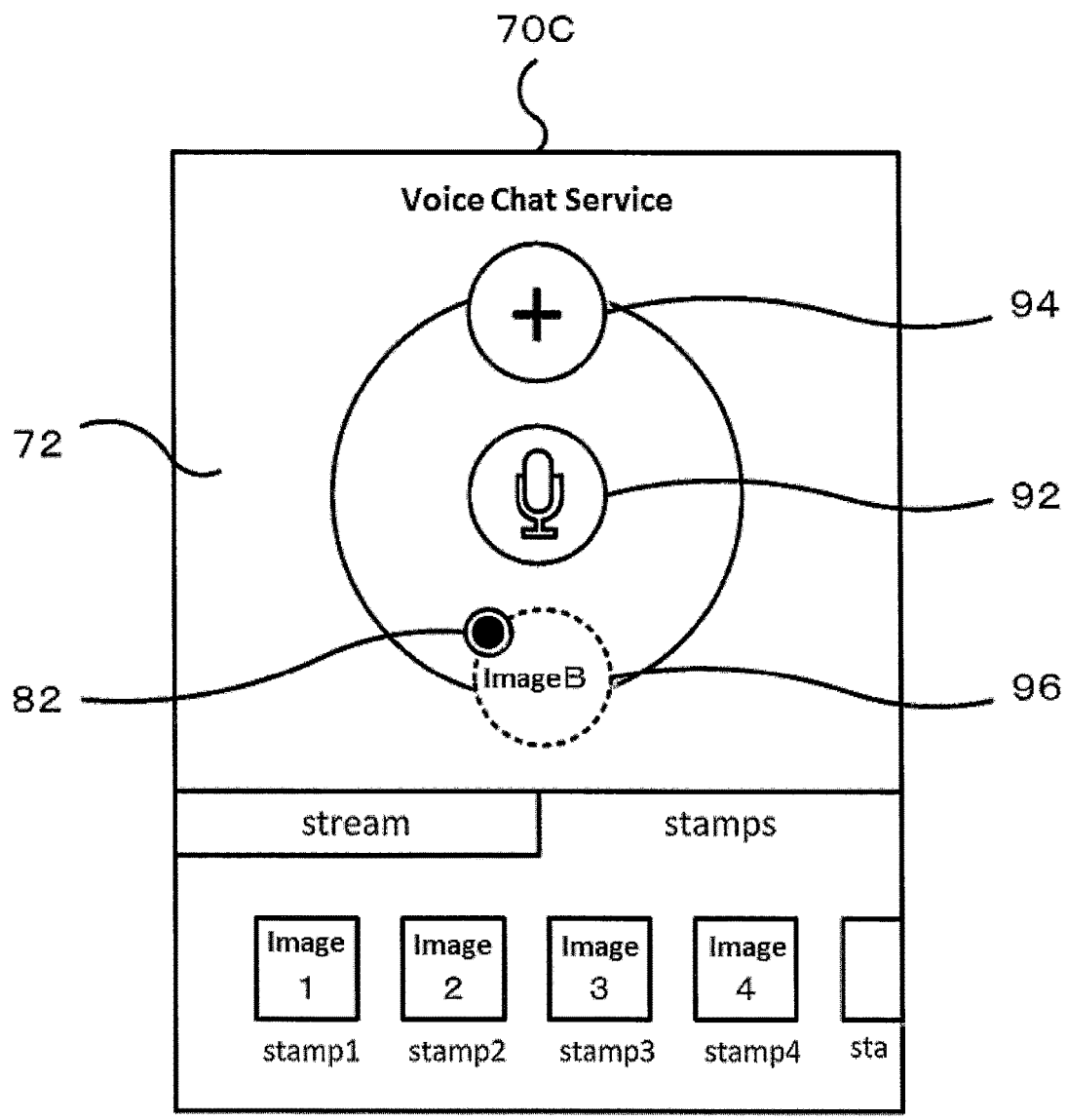
FIG. 10 illustrates an example of the voice chat screen 70C of the voice chat service screen 70 according to an embodiment.

Once the audio stamp is selected and the voice chat initiation request is made, the voice chat service screen 70 may transition to a voice chat screen 70C illustrated in FIG. 10. The voice chat screen 70C may be displayed on the terminal device 30 when a user actually performs a voice chat. As shown, in the main area 72 of the screen, provided are a microphone icon 92 situated at the center, an invitation icon 94 for newly inviting other user(s) to the voice chat (the chat unit), and user icon(s) 96 that represents other member(s) of the chat unit (user(s) other than the user of the terminal device 30) respectively. The microphone icon 92 may be configured as an icon that has a so-called mute function to enable/disable the microphone 33a of the terminal device 30 when the user selects the icon. In one embodiment, the user icon 96 may be shown such that the user can recognize a login state of the user in the voice chat service and whether the user is in the available state where the user can perform the voice chat (the chat unit) (in other words, whether the user participates in the voice chat or not). For instance, in the embodiment illustrated in FIG. 10, the login state of the user can be recognized by the login indicator 82. Moreover, the appearance of the user icon 96 may indicate whether the user is in the available state to perform the voice chat (for instance, the user icon 96 of a user who is not in the available state may be grayed out).

In one embodiment, in the main area 72 of the voice chat screen 70C, information about a single chat unit among a plurality of chat units to which the user of the terminal device 30 belongs may be displayed, and the user may be able to select a chat unit to be shown among the plurality of chat units by the user's operation (for instance, by flicking).

Referring again to the flow chart of FIG. 6, when the voice chat initiation request is received from the terminal device 30, the server 10 may firstly set a chat unit (step S100). This step may be performed by the state monitor unit 53 of the server 10. More specifically, a new record may be created in the chat unit information management table 51b, a unique value may be generated and set as the "chat unit ID," and information about the requesting user of the voice chat and the invited user(s) who has been invited to the voice chat may be set in the "member information." At this point, as for the requesting user, a value indicating that the user is in the available state (for instance, the value may be "1") may be set in the "availability flag" in the "member information," and as for the invited user, a value indicating that the user is not in the available state (for instance, the value may be "0") may be set in the "availability flag."

Subsequently, a push notification about invitation to the voice chat may be performed on the terminal device 30 of the invited user (step S120), and the voice chat initiation process may be completed. This process may be performed by the notification information transmission unit 52 of the server 10. More specifically, notification information that notifies there is an invitation to the voice chat from the requesting user and the identification information of the audio stamp selected by the requesting user may be transmitted to the terminal device 30 of the invited user.

Figure 11:
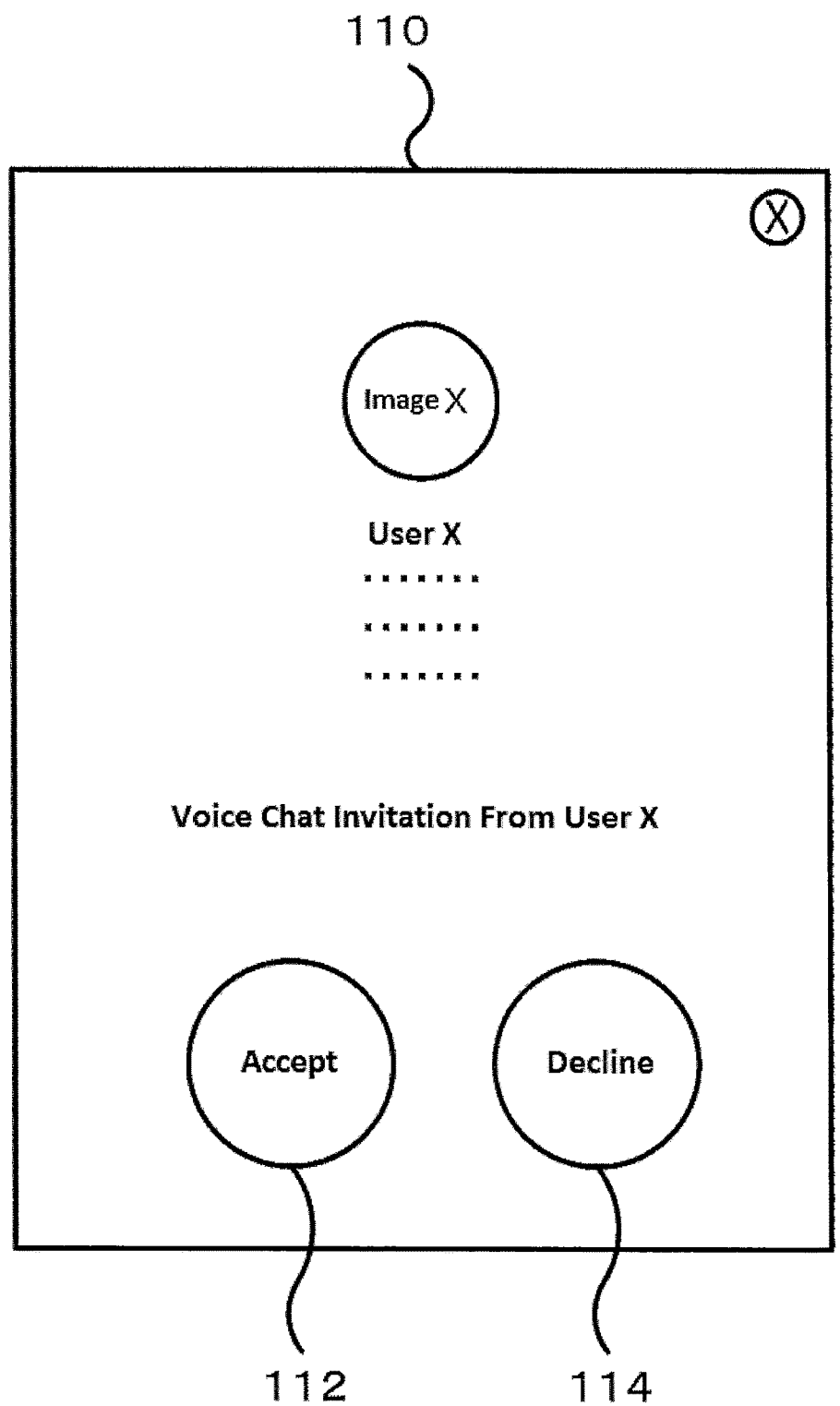
FIG. 11 illustrates an example of an invitation notification screen 110 according to an embodiment.

In one embodiment, when the voice chat initiation request is performed as described above, the notification information may be transmitted to the invited user who has been invited to the voice chat. Then, the voice chat communication between the terminal device 30 of the requesting user and the terminal device 30 of the invited user may be enabled by the features of the above-described state monitor unit 53 and the voice chat control unit 54 when the requesting user and the invited user are in the available state where they are able to perform the voice chat. Operations made after the notification information has been transmitted to the invited user and by the time the voice chat communication is enabled will be now described in detail On the terminal device 30 that has received from the server 10 the push notification (the notification information and the audio stamp identification information) about the invitation to the voice chat, an operation that corresponds to a state of the invited user at the time when he/she receives the push notification may be performed. For example, if the invited user is logged in the voice chat service (for instance, the voice chat program 60 is running) and the invited user is not performing a voice chat with other user(s) (a voice chat in other chat unit) at the time when the invited user receives the notification, an invitation notification screen 110 illustrated in FIG. 11 may be overlaid on the voice chat service screen 70. As shown, the invitation notification screen 110 may show information about the requesting user of the voice chat (the user X in this example), and contain an accept button 112 for accepting the invitation to the voice chat and a decline button 114 for declining the invitation to the voice chat. Operations to accept or decline the invitation will be described later.

Figure 12:
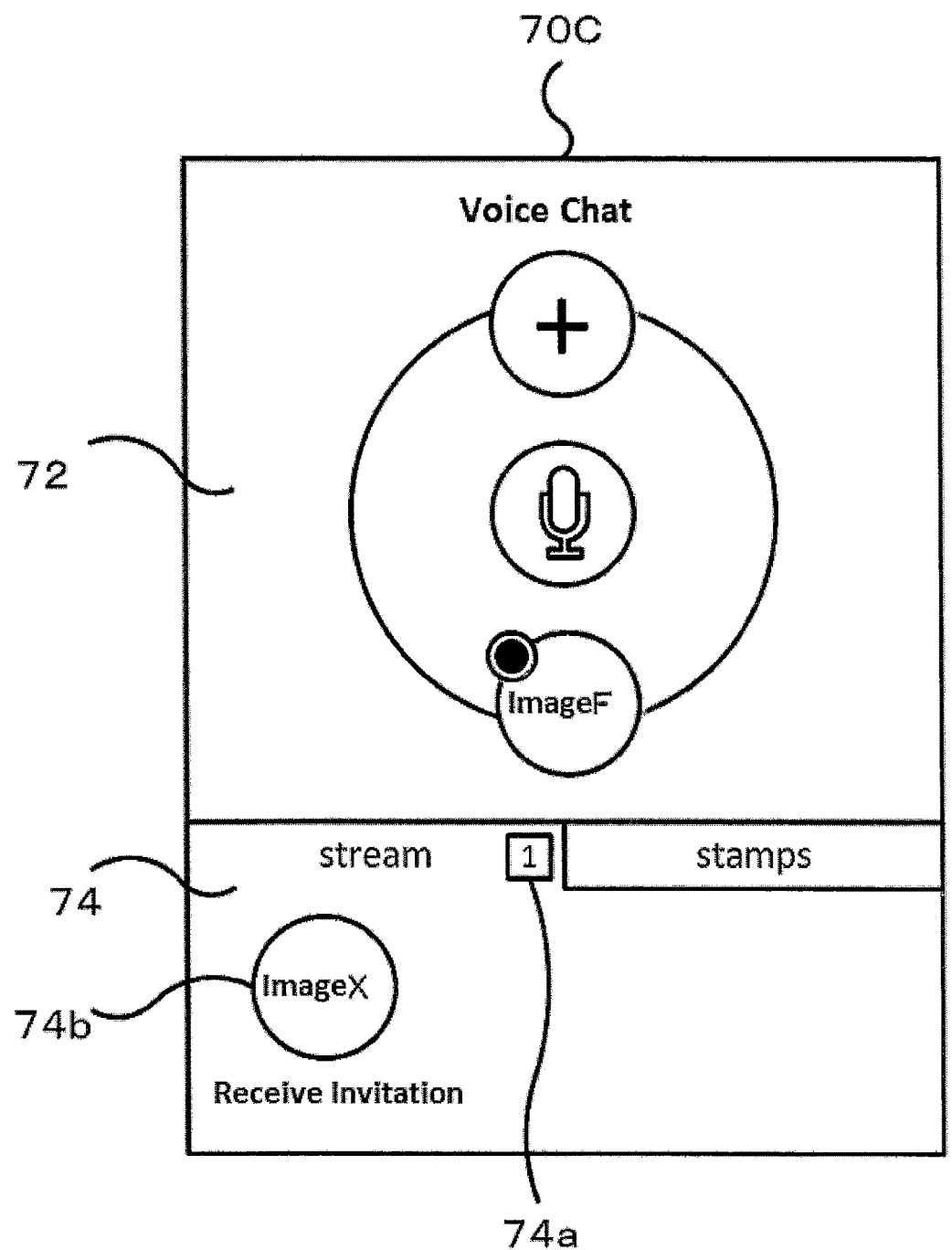
FIG. 12 illustrates an example of the voice chat screen 70C of the voice chat service screen 70 according to an embodiment.

Alternatively, if the invited user is logged in the voice chat service and is performing a voice chat with other user, for example, the stream area 74 of the voice chat service screen 70 (the voice chat screen 70C) may show that the invited user has received a push notification about the invitation of the voice chat as illustrated in FIG. 12. More specifically, in the stream area 74, the content (the number of notifications) of a newly-arrived notifications number area 74a that indicates the number of newly-arrived notifications may be updated and a user image 74b of the requesting user may be shown together with a text "Invitation received." When the invited user selects the user image 74*b* shown in the stream area 74, the above-described invitation notification screen 110 may be overlaid thereon.

Figure 13:
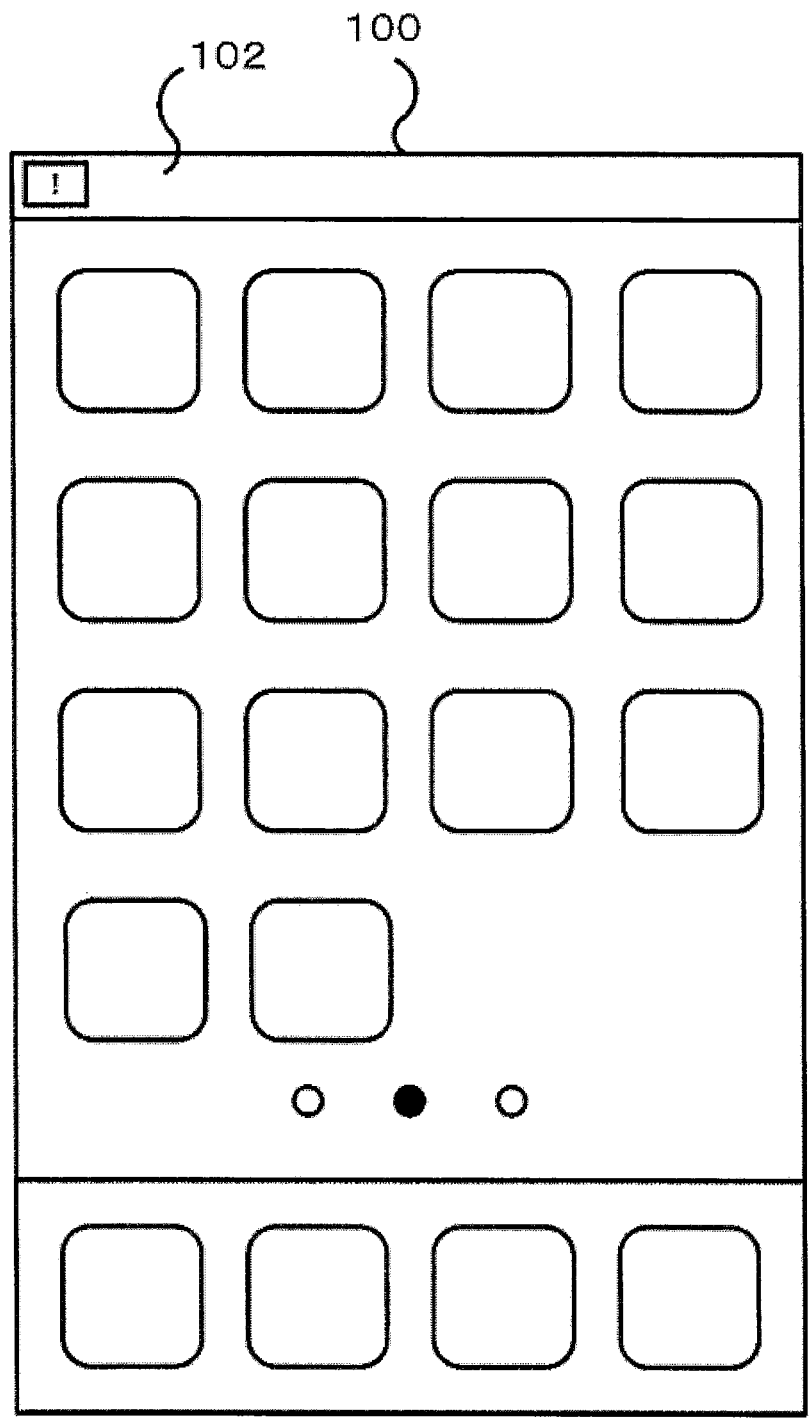
FIG. 13 illustrates an example of a home screen 100 according to an embodiment.

Alternatively, if the invited user is not logged in the voice chat service (for example, the voice chat program 60 is not running on the terminal device), a notification may be displayed by the operating system of the terminal device 30. FIG. 13 illustrates an example of a home screen 100 (a screen generated by a function of the operating system) of the terminal device 30 on which the notification performed by the function of the operating system is displayed. As shown, an icon indicating that there is a push notification to the user may be displayed in a notification information display area 102 situated at the upper end of the home screen 100. When the user selects the push notification corresponding to the icon, for example, the voice chat program 60 may be run (activated) and the user may be logged into the voice chat service. Subsequently the voice chat service screen 70 on which the invitation notification screen 110 is overlaid may be shown.

In one embodiment, at the timing when the above-mentioned invitation notification screen 110 is displayed on the terminal device 30 of the invited user, the audio stamp (the audio file) corresponding to the audio stamp identification information that has been received together with the notification information may be played. More specifically, the terminal device 30 may identify the audio stamp based on the received audio stamp identification information from among the plurality of audio stamps (audio files) stored in the storage 35 and then play the audio stamp. Playing of an audio stamp (an audio file) may be performed by using, for example, a function of the voice chat program 60 (the audio stamp playing module 63), a function of other application, or a function of the operating system. Here, the timing at which the audio stamp is played may not be limited to when the invitation notification screen 110 is displayed. For example, if the invited user is voice-chatting with other user(s), the audio stamp may be played before the invitation notification screen 110 is displayed (for example, when a notification indicating that the push notification has been received is shown in the stream area 74). Alternatively if the invited user is not logged in the voice chat service, the audio stamp may be played when the notification performed by the function of the operating system is displayed.

In this way, the invited user is able to accept or decline the invitation to the voice chat from the requesting user via the invitation notification screen 110 displayed on the terminal device 30. When the invited user selects the accept button 112 on the invitation notification screen 110, acceptance information indicating that the invited user has accepted the invitation to the voice chat may be transmitted to the server 10 from the terminal device 30. When the server 10 receives the acceptance information from the terminal device 30, the state monitor unit 53 of the server 10 may update the chat unit information management table 51*b* such that the invited user enters into the available state in which the invited user can perform the voice chat (the chat unit). More specifically, the "availability flag" of the invited user in the "member information" of the corresponding chat unit may be updated to a value that indicates that the user is in the available state.

When the invited user selects the decline button 114 on the invitation notification screen 110, declination information indicating that the invited user has declined the invitation to the voice chat may be transmitted to the server 10 from the terminal device 30. When the server 10 receives the declination information from the terminal device 30, the state monitor unit 53 of the server 10 may update the chat unit information management table 51*b* such that the invited user is removed from the members of the chat unit. More specifically, information about the invited user may be deleted from the "member information" of the corresponding chat unit. In this case, the notification information transmission unit 52 of the server 10 may transmit, to the terminal device 30 of the requesting user, a push notification about the declination of the invitation by the invited user.

Figure 14:
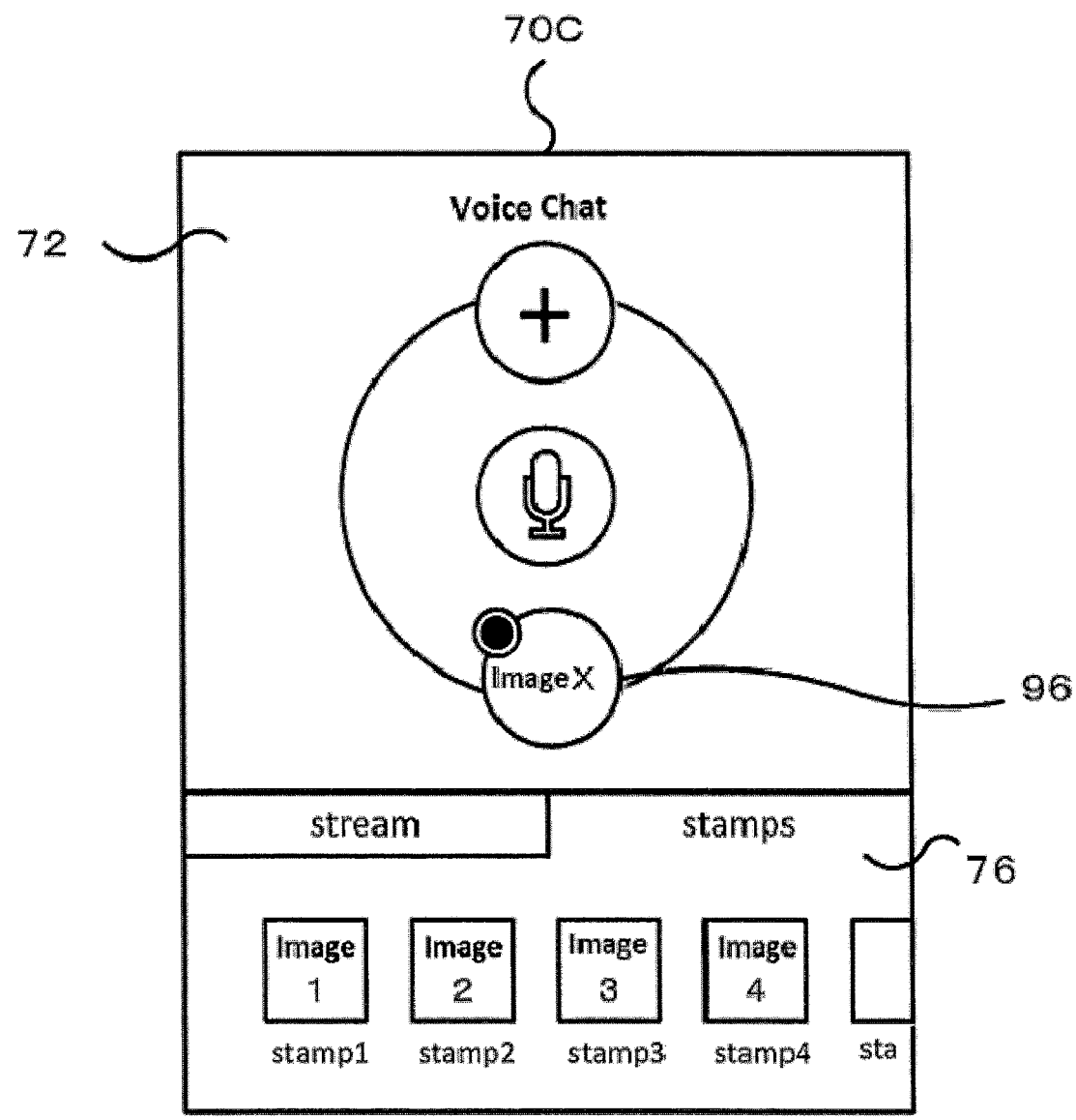
FIG. 14 illustrates an example of the voice chat screen 70C of the voice chat service screen 70 according to an embodiment.

When the invited user accepts the invitation to the voice chat and is in the available state where the invited user is able to perform the voice chat (the chat unit) while the requesting user is in the available state, both the requesting user and the invited user are in the available state. Therefore, a voice chat communication between the terminal deice 30 of the requesting user and the terminal device 30 of the invited user may be allowed by the above-described function of the voice chat control unit 54 of the server 10, and the voice chat communication may be performed between the terminal devices 30 by the function of the voice chat communication performing module 61 of the voice chat program 60. FIG. 14 illustrates an example of the voice chat screen 70C displayed on the terminal device 30 of the invited user at this point. As shown, the user icon 96 corresponding to the requesting user (the user X) of the voice chat may be shown in the main area 72. Moreover, a list of information about the audio stamps owned by the requesting user may be shown in the stamp area 76 (the requesting user is a member of the voice chat (the chat unit)). On the terminal device 30 of the requesting user, the voice chat screen 70C which is the same as the voice chat screen 70C of FIG. 14 may be displayed.

When the voice chat communication between the terminal device 30 of the requesting user and the terminal device 30 of the invited user is enabled in the above-described manner, the requesting user and the invited user are able to start the voice chat. More specifically, audio data of sound/voice input through the microphone 33*a* of a terminal device 30 of a user may be transmitted to terminal device(s) 30 of other user(s) and the audio is output from the speaker 33*b*.

Figure 15:
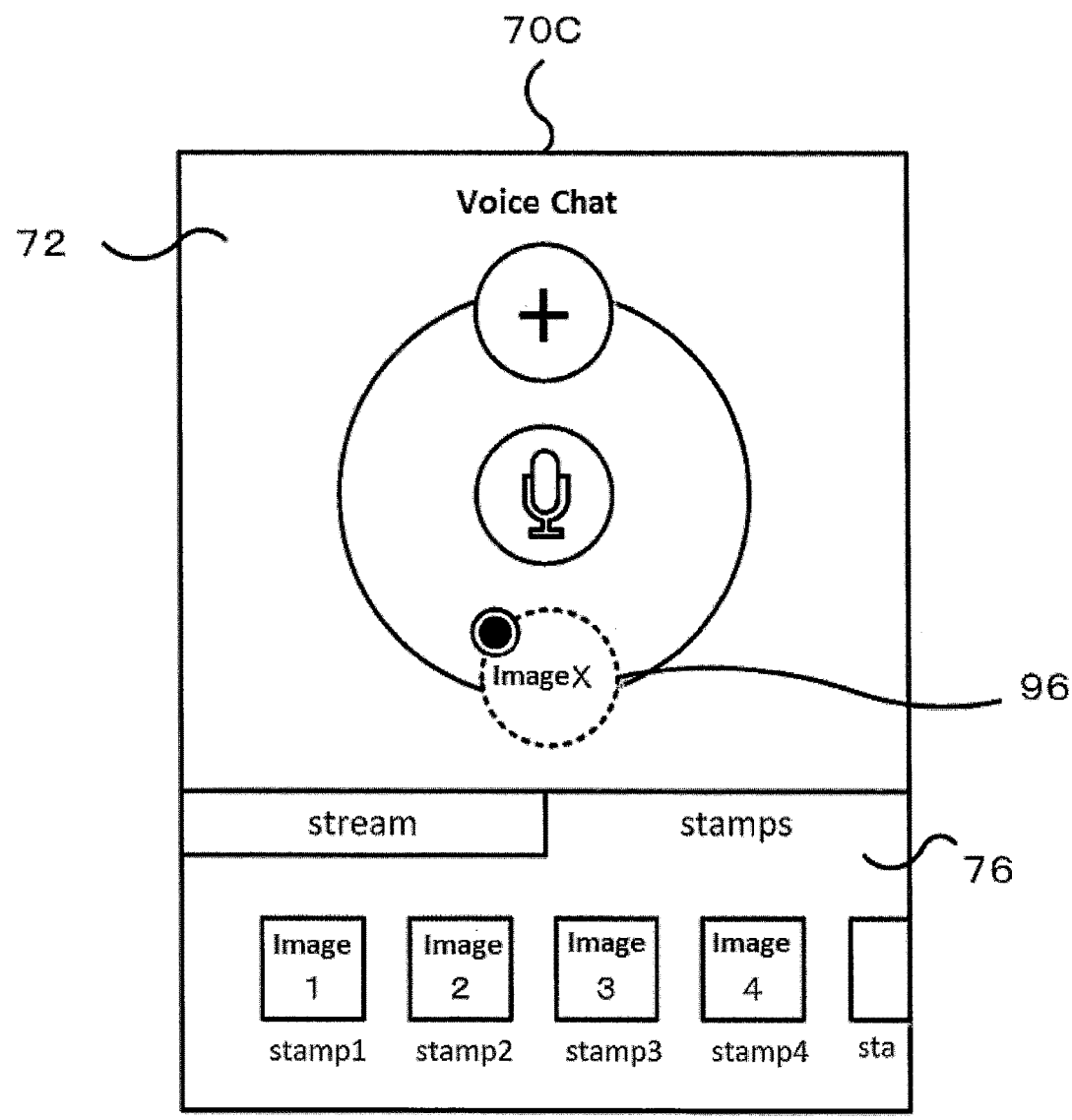
FIG. 15 illustrates an example of the voice chat screen 70C of the voice chat service screen 70 according to an embodiment.

Whereas when the invited user accepts the invitation to the voice chat and is in the available state where the invited user is able to perform the voice chat but the requesting user is not in the available state, a voice chat communication between the terminal device 30 of the requesting user and the terminal device 30 of the invited user is not allowed. FIG. 15 illustrates an example of the voice chat screen 70C displayed on the terminal device 30 of the invited user at this point. As shown, the user icon 96 corresponding to the requesting user (the user X) in the main area 72 may be shown in such a manner as to indicate that the user is not in the available state (for example, the icon is grayed out). The case where the requesting user is not in the available state when the invited user accepts the invitation to the voice chat may include, for example, a case where the requesting user has logged off (the requesting user closed the voice chat program 60) after he/she had made the voice chat initiation request, a case where the requesting user has started a voice chat with other user (a voice chat in a different chat unit) after he/she had made the voice chat initiation request, and the like.

In one embodiment, when the invited user accepts the invitation to the voice chat and is in the available state where the invited user is able to perform the voice chat but the requesting user is not in the available state, the notification information transmission unit 52 of the server 10 may transmit, to the terminal device 30 of the requesting user, a push notification indicating that the invited user has accepted the invitation. In the terminal device 30 of the requesting user who received the push notification, an operation according to a state of the requesting user when he/she received the push notification may be performed. For example, a function of the operating system may notify that the user has received the push notification about the acceptance of the invitation, or the stream area 74 of the voice chat screen 70C may show the notification to notify that the user has received the push notification about the acceptance of the invitation.

Figure 16:
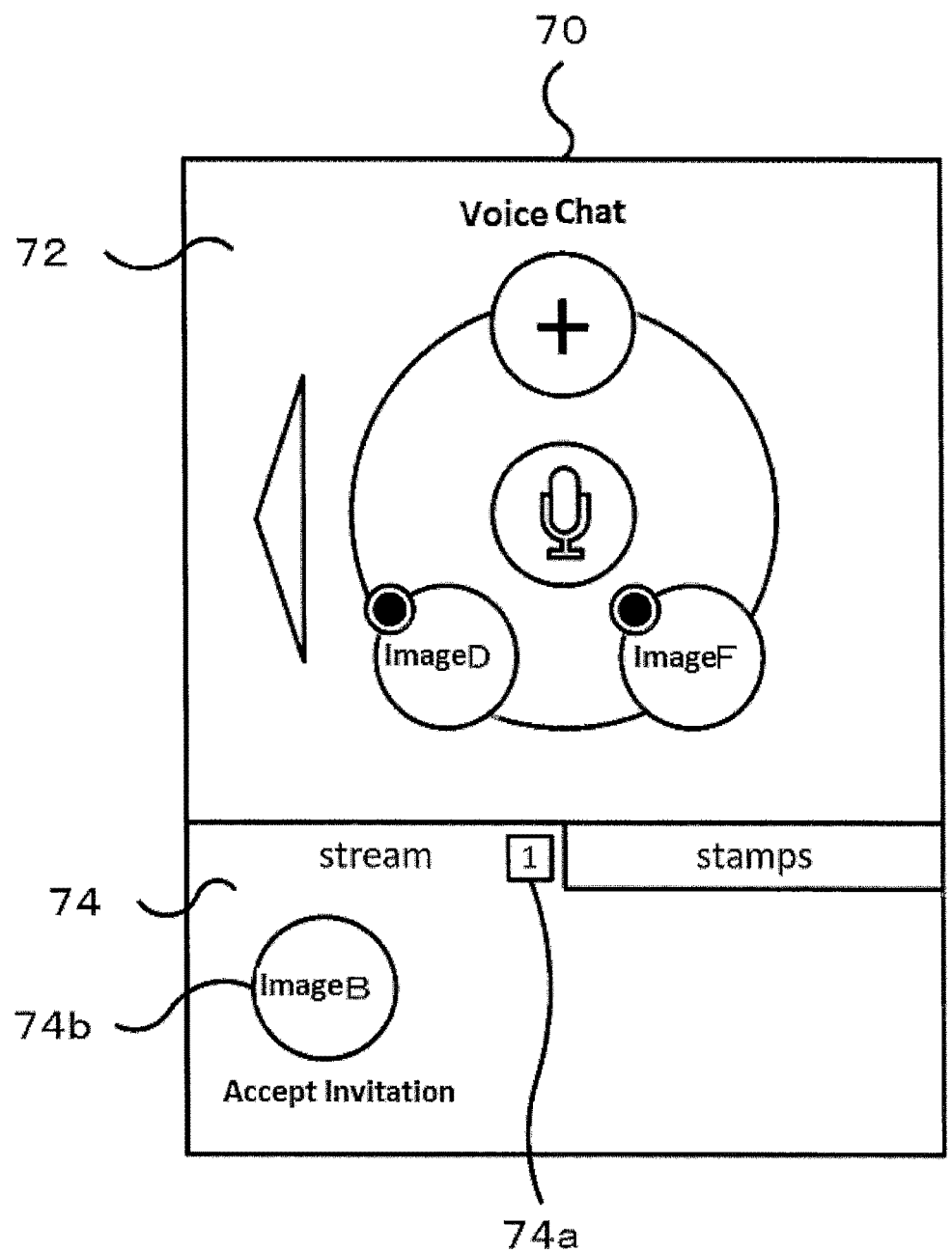
FIG. 16 illustrates an example of the voice chat screen 70C of the voice chat service screen 70 according to an embodiment.
Figure 17:
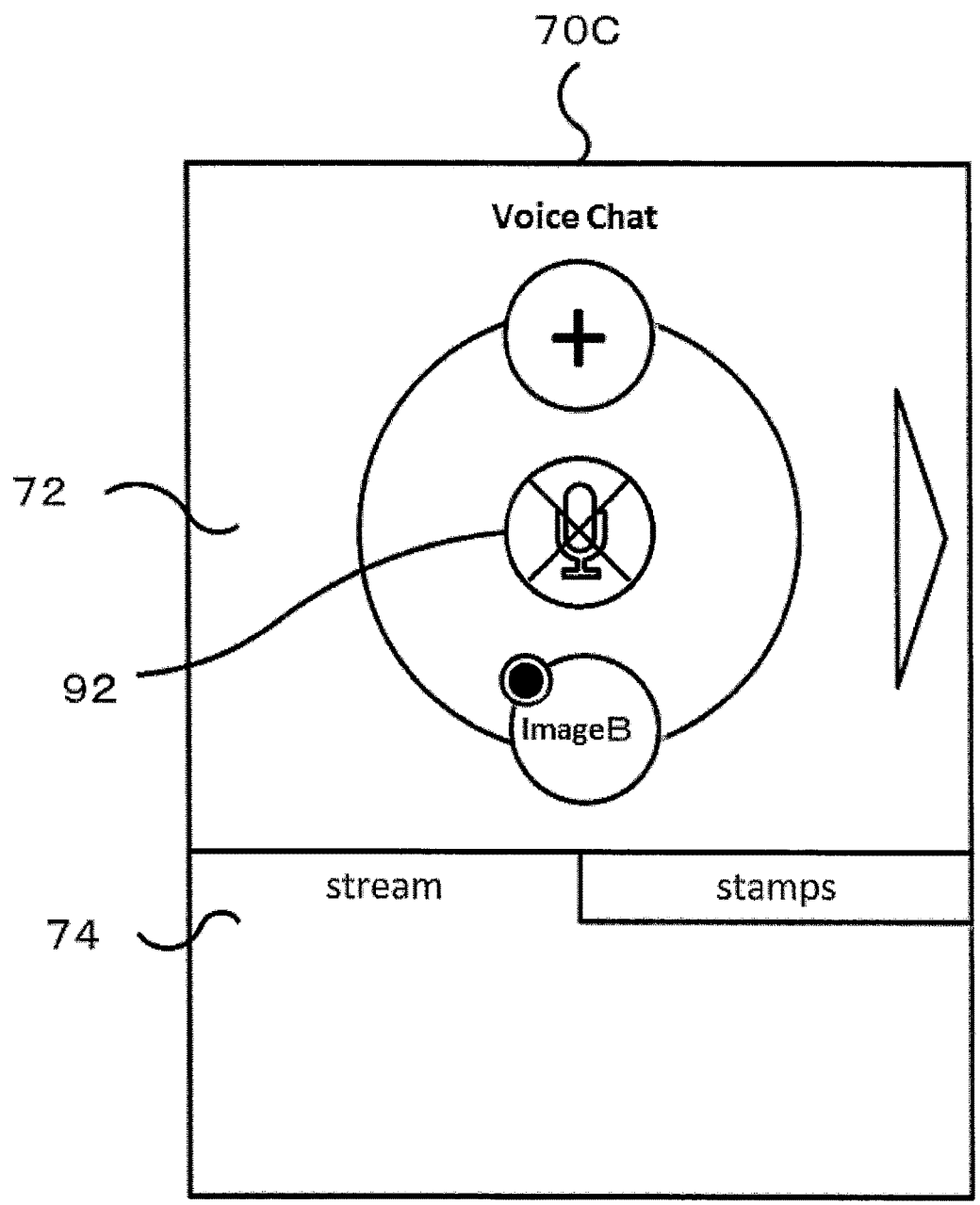
FIG. 17 illustrates an example of the voice chat screen 70C of the voice chat service screen 70 according to an embodiment.

FIG. 16 illustrates an example of the voice chat screen 70C displayed on the terminal device 30 of the requesting user in the case where the requesting user is performing a voice chat with other user(s) (a user D and a user F in this example) at the time when the invited user accepts the invitation to the voice chat. As shown, the stream area 74 of the voice chat screen 70C may indicate that a push notification about the acceptance of the invitation is received. More specifically, the content (the number of notifications) of the newly received notifications number area 74*a* may be updated and the user image 74*b* of the invited user (the user B) who has accepted the invitation may be shown together with a text "Invitation accepted" Subsequently when the requesting user selects the user image 74*b* in the stream area 74 (or flicks the main area 72), the main area 72 may be switched to display information about the voice chat (the chat unit) with the invited user (the user B), as illustrated in FIG. 17. At this point, the voice chat between the requesting user and the invited user is not enabled yet but the requesting user continues to voice-chat with the other users (the user D and the user F) so that the user icon 92 in the main area 72 is shown in such a manner as to indicate the disabled state (a mute state) of the microphone 33*a* (a disabled state indication).

When the requesting user selects the microphone icon 92 in the disabled state indication, the microphone icon 92 may then be shown in such a manner as to indicate an enabled state (non-mute state) of the microphone 33*a* (an enabled state indication), and the requesting user may be switched to the available state where the requesting user is able to chat with the invited user (the user B) (the requesting user may participate in the voice chat with the invited user (the user B)). The state monitor unit 53 of the server 10 may update the chat unit information management table 51*b* such that the requesting user enters into the available state where the requesting user is able to perform the voice chat (the chat unit) with the invited user (the user B). More specifically, the "availability flag" of the requesting user in the "member information" of the corresponding chat unit may be updated to a value that indicates that the requesting user is in the available state. Moreover, the voice chat with other users (the user D and the user F) performed by the requesting user may be no longer in an enabled state so that the "availability flag" of the requesting user in the "member information" of the corresponding chat unit is updated to a value that indicates that the requesting user is not in the available state. When the invited user remains in the available state, both the requesting user and the invited user are in the available state so that the voice chat between the terminal device 30 of the requesting user and the terminal device 30 of the invited user is enabled by the function of the voice chat control unit 54 of the server 10.

As described above, in one embodiment, the user of the terminal device 30 selects (switches) the chat unit to be enabled (in other words, the chat unit in which to perform a voice chat (the chat unit to be participated in)) by switching the chat unit displayed in the main area 72 of the voice chat screen 70C by flicking or the like to select the microphone icon 92 (to switch between the enabled state indication and the disabled state indication). In other words, the state monitor unit 53 of the server 10 may update the "availability flag" of the chat unit information management table 51*b* based on the data transmitted from the terminal device 30 such that the chat unit selected by the user by operating the terminal device 30 (the voice chat screen 70C) is in an enabled state.

In one embodiment, after a new voice chat is started (a new chat unit is created), members of the chat unit may be able to invite a new user(s). In this case, the same operation as the above-described operation related to the invited user performed when a voice chat is newly started may be performed for the newly invited user. More specifically, when a user selects the above-mentioned invitation icon 94 situated in the main area 72 of the voice chat screen 70C, the friend list screen 80 illustrated in FIG. 8 may be overlaid thereon. Subsequently when the user selects a desired user(s) whom the user would like to newly invite from among the friends in the list, the screen is switched to the friend details screen 70B illustrated in FIG. 9. By selecting any of the audio stamps listed in the stamp area 76 of the friend details screen 70B, the user is able to perform an invitation request to invite the selected user(s) to the voice chat (the chat unit). The state monitor unit 53 of the server 10 that has received the invitation request from the terminal device 30 may update the "member information" of the chat unit information management table 51*b* such that the newly invited user(s) become a member(s) of the chat unit. The state monitor unit 53 may then perform a push notification about the invitation to the voice chat onto the terminal device(s) 30 of the newly invited user(s). The following operations may be the same as those for the newly started voice chat described above. For example, when the newly invited user(s) accepts the invitation to the voice chat, the newly invited user(s) enters into the available state where the user(s) is able to perform the voice chat.

In one embodiment, a user belonging to a chat unit may be able to request the terminal device 30 of another user 30 in the same chat unit to play an audio stamp. More specifically, when any of audio stamps in the list shown in the stamp area 76 of the voice chat screen 70C is selected, for example, the identification information of the selected audio stamp may be transmitted to the terminal device 30 of another user via the server 10 and the audio stamp (the audio file) identified with the audio stamp identification information may be played on the terminal device 30 of the other user.

In an embodiment, a play request for the selected audio stamp may be made to all of the other users in the chat unit, or alternatively, a play request for the selected audio stamp may be made to one or more other users in the chat unit selected by the user. Further, when the play request for an audio stamp is made to a plurality of other users, a part of the other users may not own the selected audio stamp. In this case, the terminal devices 30 of the other users may fetch and play the audio stamp stored on the server 10 (by streaming or downloading). Furthermore, it may also be possible that each user fetches, automatically or in response to the operation by the user, an audio stamp owned by other user in the chat unit from the server 10 and store the audio stamp on the terminal device 30.

Figure 18:
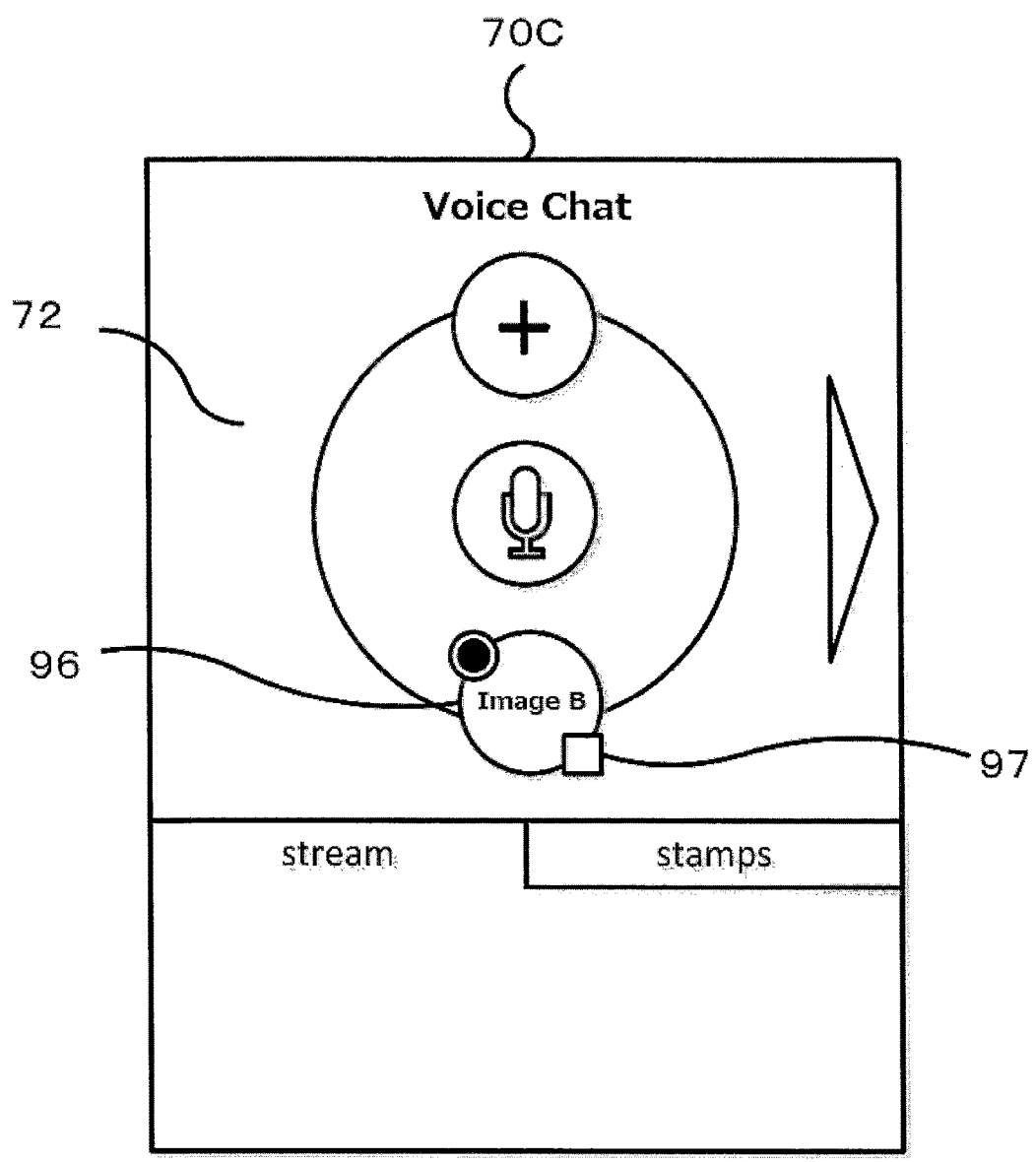
FIG. 18 illustrates an example of the voice chat screen 70C of the voice chat service screen 70 according to an embodiment.

In one embodiment, the play request for the audio stamp may be made to other users participating in the voice chat (users in the available state) and other users not participating in the voice chat (users not in the available state) among the members of the voice chat. FIG. 18 illustrates an example of the voice chat screen 70C. When a play request for an audio stamp is made to other user participating in the voice chat, this voice chat screen 70C may be displayed on the terminal device 30 of the other user. In this case, information about the audio stamp for which the play request is made (the audio icon 97 in this case) may be displayed in the lower right of the user icon 96 corresponding to the user making the play request, so as to inform the user that the play request for the audio file has been received. When the user selects the user icon 96 including the audio icon 97, the audio stamp (the audio file) may be played on the terminal device 30. In an embodiment, if the user receives a play request for another audio stamp before he/she selects the user icon 96 to play the corresponding audio stamp, the audio icon 97 of the audio stamp for which the last play request is received may be displayed. When the user selects the user icon 96, a plurality of audio stamps not yet played may be played sequentially. It may also be possible that the terminal device 30 outputs a predetermined alarm sound at the timing of receiving the play request of the audio stamp (e.g., when displaying the information about the audio stamp (the audio icon 97)). Furthermore, it may also be possible that the audio stamp is played without a user action such as selection of the user icon 96.

Figure 19:
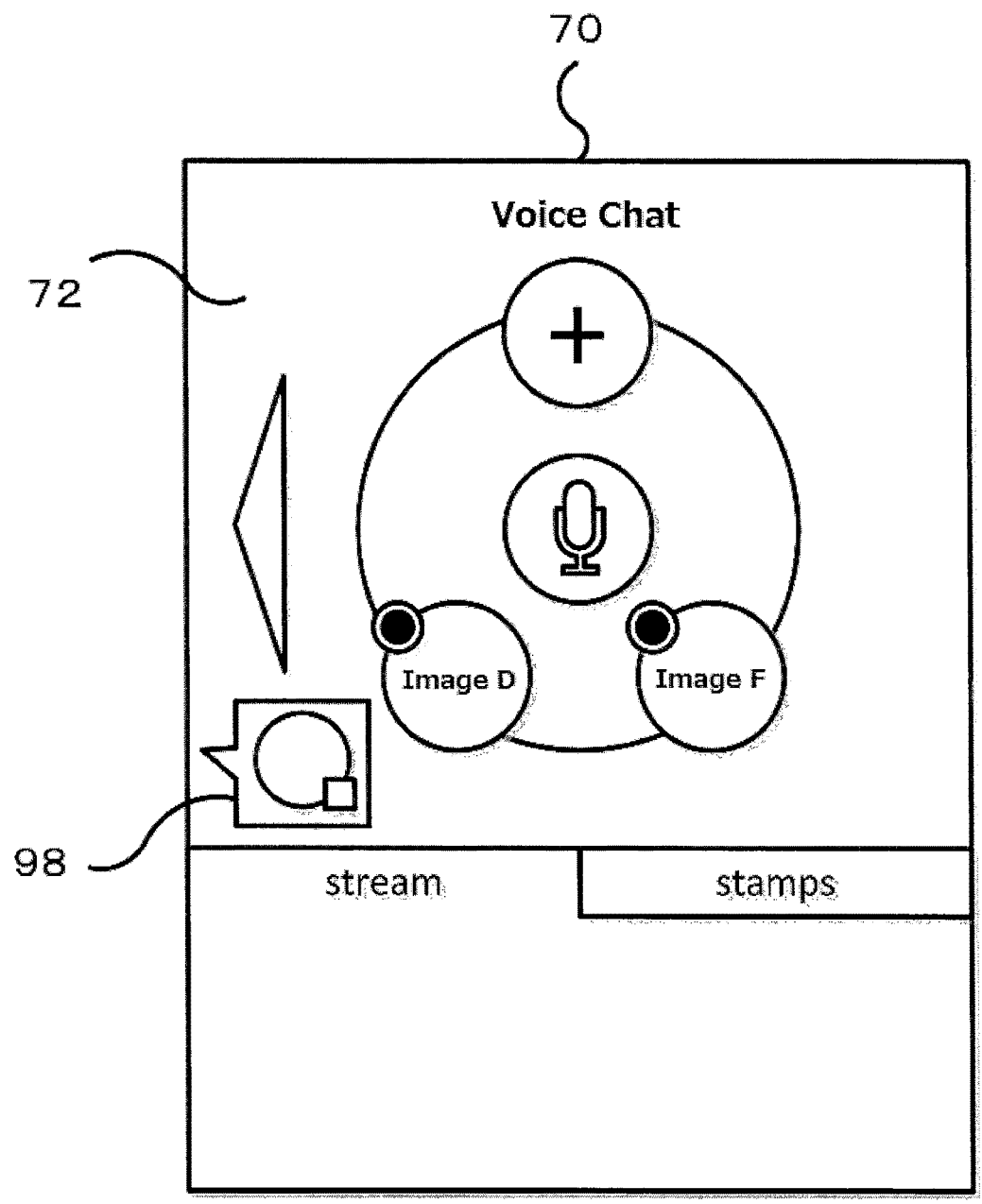
FIG. 19 illustrates an example of the voice chat screen 70C of the voice chat service screen 70 according to an embodiment.
Figure 20:
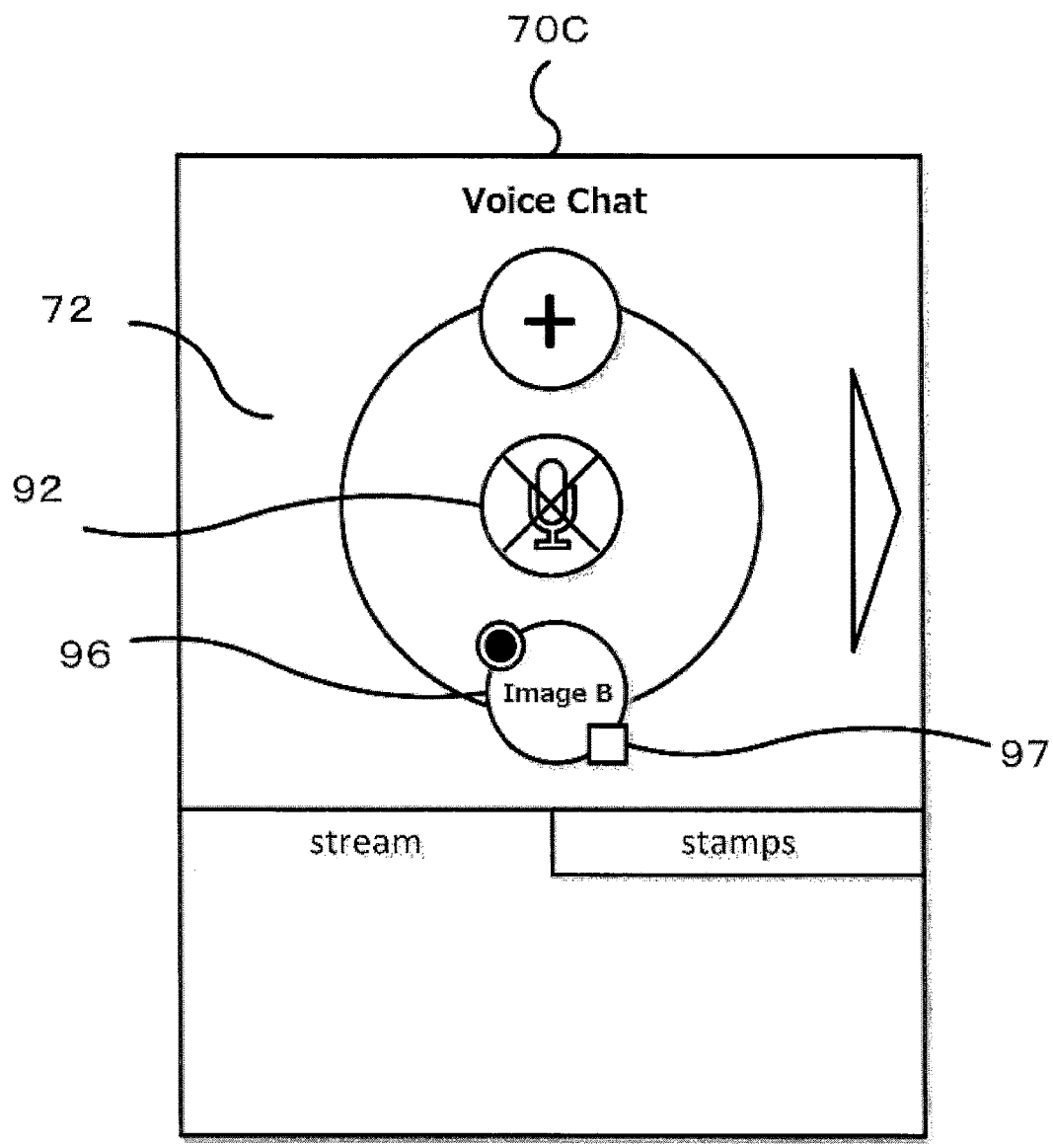
FIG. 20 illustrates an example of the voice chat screen 70C of the voice chat service screen 70 according to an embodiment.

FIG. 19 illustrates an example of the voice chat screen 70C. When a play request for an audio stamp is made to other user not participating in the voice chat, this voice chat screen 70C may be displayed on the terminal device 30 of the other user. In this case, a receipt notification 98 indicating that a play request for an audio stamp has been received from a member of other voice chat may be displayed in the main area 72 for displaying information about the voice chat (the chat unit) being performed (participated in). In an embodiment, the receipt notification 98 may include information about the user (e.g., a user image) who has made the play request for the audio stamp, and information about the audio stamp (e.g., an audio icon) for which the play request has been made. When the user selects the receipt notification 98, the main area 72 may be switched to the display of the corresponding chat unit (the chat unit of the audio stamp for which the play request has been made by the user making the play request), as illustrated in FIG. 20. When the user selects the user icon 96, the audio stamp may be played on the terminal device 30. In FIG. 20, the microphone icon 92 may be displayed in the disabled state. This may indicate that, at this moment, the other user who has played the audio stamp still participates in the audio chat (the chat unit) in which he/she has been participating. When the other user selects the microphone icon 92, the audio chat participated in may be switched.

In an embodiment, a user can make a play request for an audio stamp to a member of an audio chat (a chat unit) to which he/she belongs but in which he/she is not participating. For example, a play request for an audio stamp can be made to other user who is a member of the audio chat (the user B in this example) without switching the audio chat to participate in by selecting the microphone icon 92 on the voice chat screen 70C of FIG. 20.

Thus, in an embodiment, members of a chat unit can enjoy playing of an audio stamp on the terminal device 30 of other member of the chat unit (from the user's point of view, "sending" of an audio stamp to other user), regardless of the participation state in the voice chat. For example, a user can enjoy communication by audio stamps, as well as speech communication through the microphones 33a, in a chat unit in which he/she participates. Further, for example, a user can enjoy speech communication in a chat unit in which he/she participates and enjoy communication by audio stamps in a chat unit in which he/she does not participate. Furthermore, for example, a user can enjoy communication by audio stamps even in an environment where he/she cannot speak.

In the above-described embodiment, an audio stamp to be played on the terminal device 30 of an invited user may be selected when the voice chat initiation request is made. Alternatively, the voice chat initiation request may be made only by selecting the invited user(s) without selecting the audio stamp.

In the above-described embodiment, audio stamps owned by a user may be stored in the terminal device 30 of the user and redundantly in the server 10. It may also be possible to store the audio stamps in a different manner. For example, such audio stamps may be stored in only one of the user's terminal device 30 and the server 10, or in other devices. If the audio stamps are not stored in the terminal device 30 of the user, the audio stamps may be fetched from the device storing the audio stamps and played. Further, a play request for an audio stamp stored in the terminal device 30 of the user making the play request may be made to another user. In this case, the audio stamps (the audio files) themselves stored in the terminal device 30 of the user making the play request may be transmitted to the terminal device 30 of the other user.

In the above-described embodiment, the invited user may select whether to accept or decline an invitation to a voice chat via the invitation notification screen 110. Alternatively, it may also be possible to accept the invitation by an audio stamp. For example, the invited user may send an audio stamp to the requesting user of the invitation (make a play request for an audio stamp to the requesting user of the invitation), thereby to accept the invitation. More specifically, for example, in making a voice chat initiation request, and in newly inviting a user after a voice chat is initiated, an audio stamp (for example, an audio stamp owned by the invited user) may be sent to the invited user, and then the invited user may return the audio stamp (send the audio stamp to the requesting user of the invitation). At this moment, it may be possible to determine that the invited user has accepted the invitation to the voice chat and make the invited user enter into the available state where he/she is able to perform the voice chat (the chat unit).

In system 1 according to the embodiment as described above, the terminal devices 30 of the users who are members of a chat unit and participating in the chat unit (in the available state) may perform the voice chat communication for implementing the voice chat in the chat unit. The terminal device 30 of one user who is a member of the chat unit may make a play request for an audio file to the terminal device 30 of another user who is a member of the chat unit based on an instruction from the one user, and the terminal device 30 of the other user may play the audio file in response to the play request for the audio file. Accordingly, the user can enjoy communication by audio stamps (audio files), as well as speech communication through the microphones 33a. That is, the system 1 according to the embodiment may allow communication by sound/voice other than user speeches in voice chatting.

In the above-described embodiment, when the invited user accepts the invitation to the voice chat, the invited user may enter into the available state where the invited user can perform the voice chat (the chat unit). However, an event to make the invited user enter into the available state is not limited to this. For example, the invited user may be switched to the available state when the push notification information provided by the server 10 is displayed or when the invited user sees or confirms the notification information. Alternatively, the invited user may be switched to the available state irrespective of the presence of an action made by the invited user in response to the push notification information.

Moreover, when a new voice chat is initiated, a voice chat communication between the terminal device 30 of the requesting user and the terminal device 30 of the invited user may be immediately allowed without performing the push notification on the terminal device 30 of the invited user who is invited to the new voice chat.

In other embodiment of the invention, when a voice chat initiation request is received from the terminal device 30, the state monitor unit 53 of the server 10 may firstly check whether an invited user is in the available state where the invited user is able perform a new voice chat. For example, when the invited user is logged in the voice chat service (this can be determined by referring to the "login state" of the user information management table 51a) and the invited user is not performing a voice chat with other user (a voice chat in other chat unit) (this can be determined by referring to the chat unit information management table 51b), it may be determined that the invited user is in the available state where the invited user is able to perform the new voice chat. When it is determined that the invited user is available to perform the new voice chat, the state monitor unit 53 of the server 10 may determine that both the requesting user and the invited user are in the available state and may set a chat unit (create a new record in the chat unit information management table 51b). Subsequently the function of the voice chat control unit 54 may immediately enable the voice chat communication between the terminal device 30 of the requesting user and the terminal device 30 of the invited user. In other embodiment, when it is determined that the invited user is not in the available state in which he/she is able to perform the new voice chat, a push notification may be transmitted to the terminal device 30 of the invited user, as in the above-described embodiment.

In other embodiment, when it is determined that the invited user is in the available state in which he/she is able to perform the new voice chat and a voice chat communication is immediately enabled, the microphone 33a of the terminal device 30 of the invited user may be disabled at the start of the voice chat. When the invited user subsequently selects the microphone icon 92 on the voice chat screen 70C, the microphone 33a may be enabled.

In other embodiment, when the invited user is in the available state where the invited user is able to perform a new voice chat, a voice chat communication between the terminal device 30 of the requesting user and the terminal device 30 of the invited user is immediately enabled once the requesting user transmits the voice chat initiation request, and therefore the user can easily start a voice chat with other user(s).

In the above-described embodiment, a user is not able to perform a voice chat with other user (a voice chat in other chat unit) while the user is performing another voice chat. Alternatively a voice chat communication of more than one voice chat with different members (a plurality of chat units) may be simultaneously enabled. In this case, when a new voice chat is started, a sound volume of a voice chat which the user is currently performing may be turned down. More specifically, the sound volume of the audio data corresponding to each voice chat (chat unit) may be adjusted by a function of the voice chat control unit 54. In this way, even while the user is performing a voice chat, another voice chat (another chat unit) can be immediately started.

The processes and procedures described and illustrated herein may also be implemented by software, hardware, or any combination thereof other than those explicitly stated for the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

With respect to the use of substantially any plural and/or singular terms herein, those having skill in the art can translate from the plural to the singular and/or from the singular to the plural as is appropriate to the context.

LIST OF REFERENCE NUMBERS

10 server
30 terminal device
51 information storage unit
52 notification information transmission unit
53 state monitor unit
54 voice chat control unit
60 voice chat program
70 voice chat service screen
70A voice chat service screen (initial screen)
70B voice chat service screen (friend details screen)
70C voice chat service screen (voice chat screen)
80 friend list screen
100 home screen
110 invitation notification screen

What is claimed is:

1. A system including a plurality of terminal devices and configured to allow a voice chat between users of the plurality of terminal devices, wherein:
   the terminal device of a first user who is a member of a chat unit transmits a voice chat initiation request to the terminal device of a second user who is a member of the chat unit, the voice chat initiation request including audio file identification information that identifies an audio file selected by the first user,
   the terminal device of the first user and the terminal device of the second user perform voice chat communication for implementing the voice chat in the chat unit,
   the terminal device of the second user, upon receipt of the voice chat initiation request, identifies the audio file based on the audio file identification information to play the audio file.

2. The system of claim 1, wherein
the chat unit includes a participating user participating in the voice chat in the chat unit and a non-participating user not participating in the voice chat in the chat unit, and
the terminal device of the participating user performs the voice chat communication.

3. The system of claim 1, wherein performing the voice chat communication on the terminal device of the first user includes transmitting audio data of sound/voice inputted via an audio input unit of the terminal device of the first user to the terminal device of the second user, and receiving audio data of sound/voice inputted via an audio input unit of the terminal device of the second user.

4. The system of claim 1 comprising:
a first storage device for storing the one or more audio files stored on the terminal device of the second user,
wherein the terminal device of the first user fetches, in accordance with the selection of the audio file by the first user, the audio file from the first storage device and plays the audio file.

5. The system of claim 1, wherein the terminal device of the second user displays the voice chat initiation request.

6. The system of claim 5, wherein the voice chat initiation request includes information about the first user.

7. The system of claim 5, wherein the terminal device of the second user plays the audio file in accordance with a predetermined action by the second user.

8. The system of claim 1, wherein the terminal device of the first user displays in a selectable manner one or more chat units to which the first user belongs as a member thereof, displays in a selectable manner one or more other users who are members of a chat unit selected from the one or more chat units by the first user, and requests the terminal device of the second user selected from the one or more other users by the first user to play the audio file.

9. A method of allowing a voice chat between users of a plurality of terminal devices, the method comprising the steps of:
transmitting, by the terminal device of a first user who is a member of a chat unit, a voice chat initiation request to the terminal device of a second user who is a member of the chat unit, the voice chat initiation request including audio file identification information that identifies an audio file selected by the first user,
performing, by the terminal devices of the first user and the second user, voice chat communication for implementing the voice chat in the chat unit;
identifying, by the terminal device of the second user, the audio file based on the audio file identification information to play the audio file.

10. A computer-readable storage medium storing a program for allowing a voice chat between users of a plurality of terminal devices, the program causing, upon execution on the plurality of terminal devices, the steps of:
transmitting, by the terminal device of a first user who is a member of a chat unit, a voice chat initiation request to the terminal device of a second user who is a member of the chat unit, the voice chat initiation request including audio file identification information that identifies an audio file selected by the first user,
performing, by the terminal devices of the first user and the second user voice chat communication for implementing the voice chat in the chat unit;
identifying, by the terminal device of the second user, the audio file based on the audio file identification information to play the audio file.

* * * * *